(12) United States Patent
 Dasbach et al.

(10) Patent No.: US 12,533,466 B2
(45) Date of Patent: Jan. 27, 2026

(54) ARRANGEMENT FOR A DRUG DELIVERY DEVICE

(71) Applicant: Sanofi, Paris (FR)

(72) Inventors: Uwe Dasbach, Frankfurt am Main (DE); Thomas Mark Kemp, Melbourn (GB); Tomas Correa, Melbourn (GB)

(73) Assignee: Sanofi, Paris (FR)

(*) Notice: Subject to any disclaimer, the term of this patent is extended or adjusted under 35 U.S.C. 154(b) by 556 days.

(21) Appl. No.: 18/018,206

(22) PCT Filed: Aug. 3, 2021

(86) PCT No.: PCT/EP2021/071612
§ 371 (c)(1),
(2) Date: Jan. 26, 2023

(87) PCT Pub. No.: WO2022/029097
PCT Pub. Date: Feb. 10, 2022

(65) Prior Publication Data
US 2023/0270942 A1    Aug. 31, 2023

(30) Foreign Application Priority Data

Aug. 7, 2020 (EP) .................................... 20315381

(51) Int. Cl.
*A61M 5/20* (2006.01)
*A61M 5/31* (2006.01)
*A61M 5/32* (2006.01)

(52) U.S. Cl.
CPC ....... *A61M 5/20* (2013.01); *A61M 2005/2013* (2013.01)

(58) Field of Classification Search
CPC ............ A61M 5/20; A61M 2005/2013; A61M 5/3146; A61M 2005/3267; A61M 5/326;
(Continued)

(56) References Cited

U.S. PATENT DOCUMENTS

2016/0303327 A1    10/2016 Moren
2018/0093046 A1*   4/2018 Hourmand .......... A61M 5/2033
(Continued)

FOREIGN PATENT DOCUMENTS

CN    104105516 A    10/2014
CN    105188806 A    12/2015
(Continued)

OTHER PUBLICATIONS

International Preliminary Report on Patentability in International Appln. No. PCT/EP2021/071612, mailed on Feb. 16, 2023, 12 pages.
(Continued)

*Primary Examiner* — Jason E Flick
(74) *Attorney, Agent, or Firm* — Fish & Richardson P.C.

(57) ABSTRACT

A drug delivery device includes a housing, a blocking feature rotationally secured relative to the housing, a drive unit, a rod operatively coupled to the drive unit and arranged to move distally relative to the housing when the rod is released, and a movable trigger member. The rod is rotatable relative to the housing and has an unprimed state and a primed state. In the unprimed state, the blocking feature is arranged to block a rotation of the rod into the release position, and in the primed state, a trigger member feature is arranged to block rotation of the rod into the release position. The trigger member is arranged to move relative to the housing to release the rod. To switch from the unprimed state into the primed state, the trigger member moves and a movement is converted into an axial movement of the rod relative to the blocking feature.

20 Claims, 12 Drawing Sheets

(58) Field of Classification Search
CPC ............ A61M 5/2033; A61M 5/31511; A61M 5/31501; A61M 5/315; A61M 5/31576; A61M 5/31583; A61M 5/31585; A61M 5/31586; A61M 5/31565
See application file for complete search history.

(56) References Cited

U.S. PATENT DOCUMENTS

| | | | |
|---|---|---|---|
| 2018/0104415 A1* | 4/2018 | Boström | ............ A61M 5/31511 |
| 2019/0192776 A1 | 6/2019 | Alexandersson | |

FOREIGN PATENT DOCUMENTS

| | | |
|---|---|---|
| CN | 105682710 A | 6/2016 |
| CN | 105682715 A | 6/2016 |
| EP | 2583708 | 4/2013 |
| EP | 2823839 | 1/2015 |
| EP | 2978472 A1 | 2/2016 |
| EP | 2978472 | 2/2019 |
| JP | 2017-528217 A | 9/2017 |
| JP | 2018-512973 A | 5/2018 |
| JP | 2018-516690 A | 6/2018 |
| JP | 2019-503207 A | 2/2019 |
| WO | WO 2011/154486 A1 | 12/2011 |
| WO | WO 2013/092670 A1 | 6/2013 |
| WO | WO 2014/154491 | 10/2014 |
| WO | WO 2014/154491 A1 | 10/2014 |
| WO | WO 2015/032771 A1 | 3/2015 |
| WO | WO 2015/032777 A1 | 3/2015 |
| WO | WO 2016/034407 A2 | 3/2016 |
| WO | WO 2016/169756 A1 | 10/2016 |
| WO | WO 2016/193349 A1 | 12/2016 |
| WO | WO 2016/193350 A1 | 12/2016 |
| WO | WO 2019/086576 A1 | 5/2019 |
| WO | WO 2022/029097 | 2/2022 |

OTHER PUBLICATIONS

International Search Report and Written Opinion in International Appln. No. PCT/EP2021/071612, mailed on Nov. 22, 2021, 14 pages.

* cited by examiner

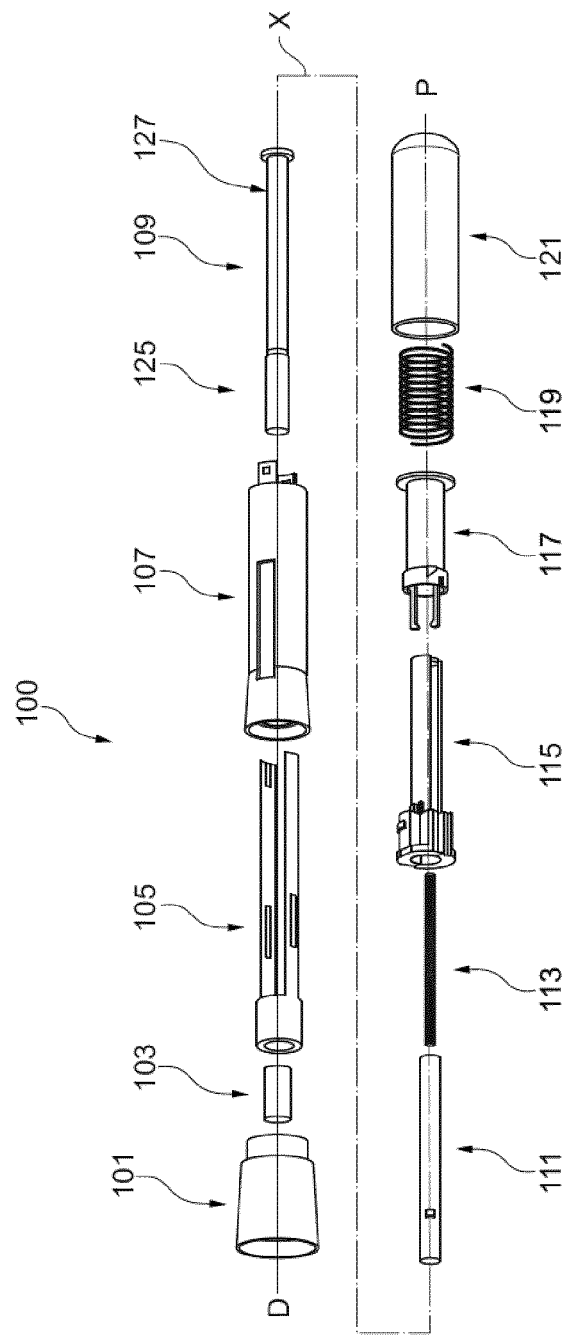

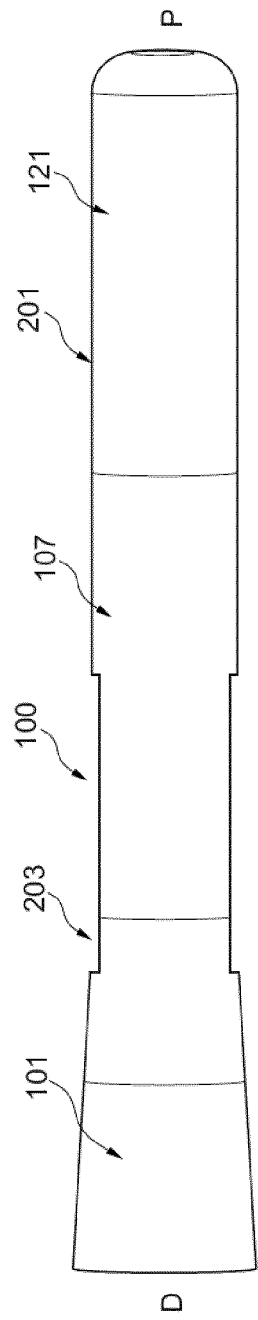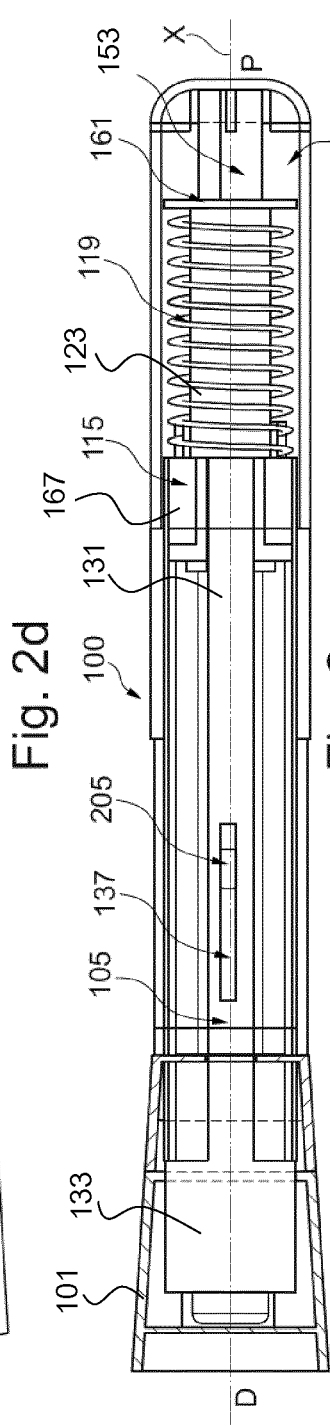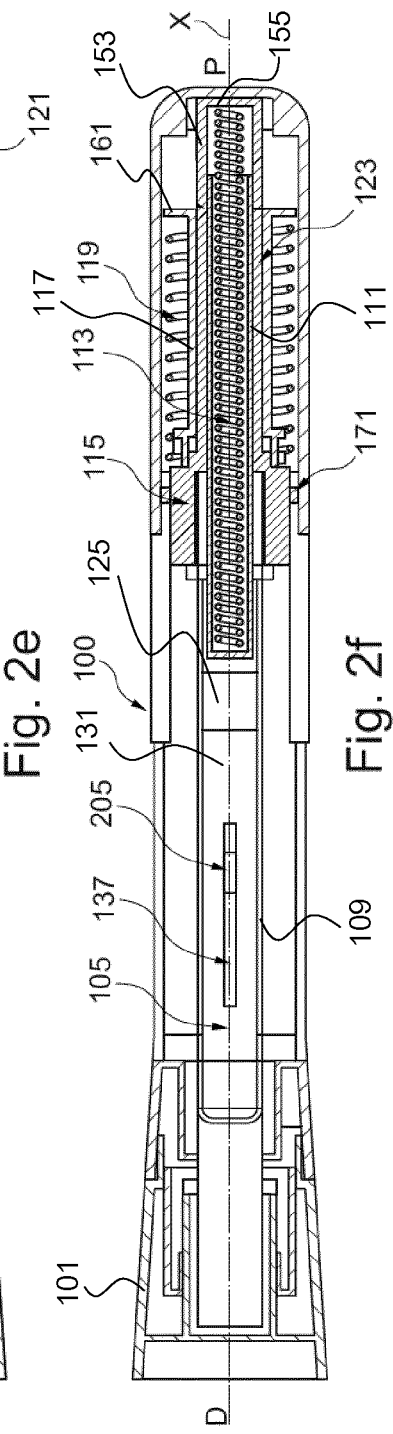

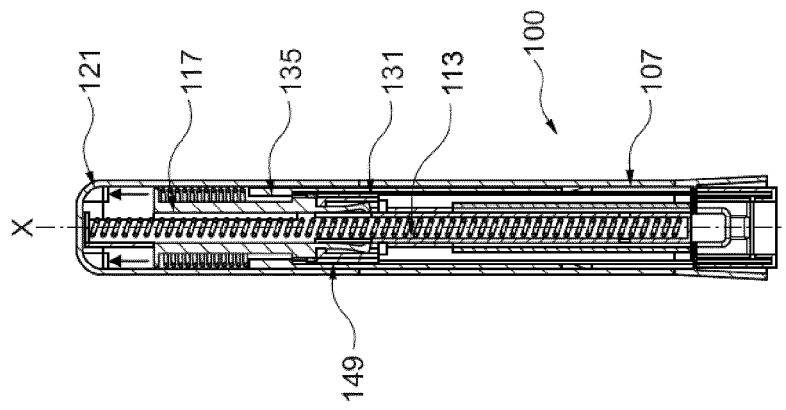
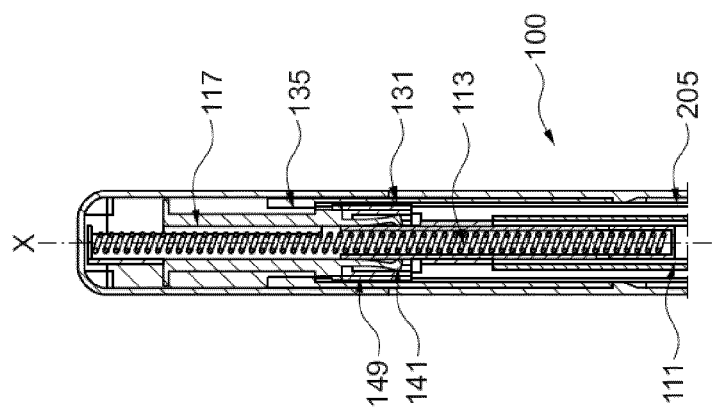
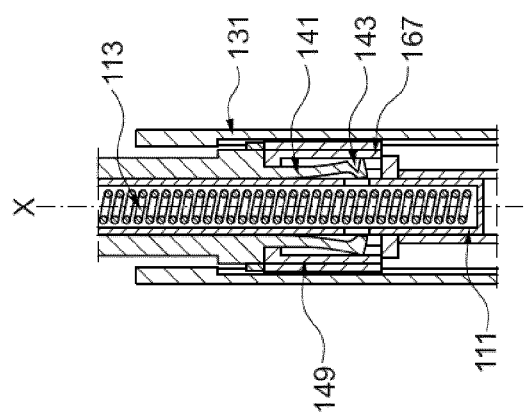

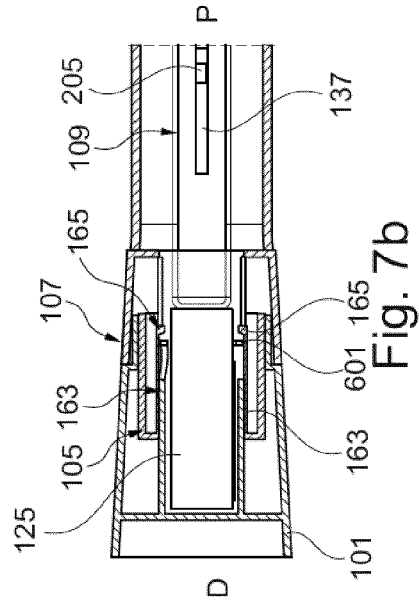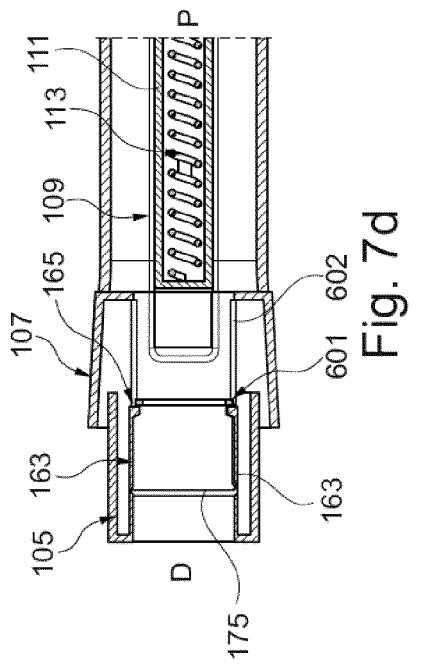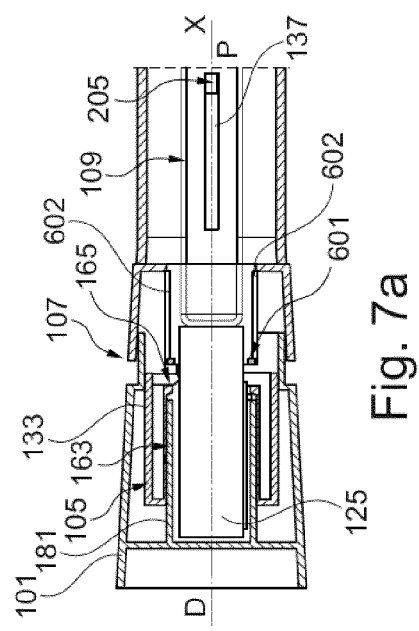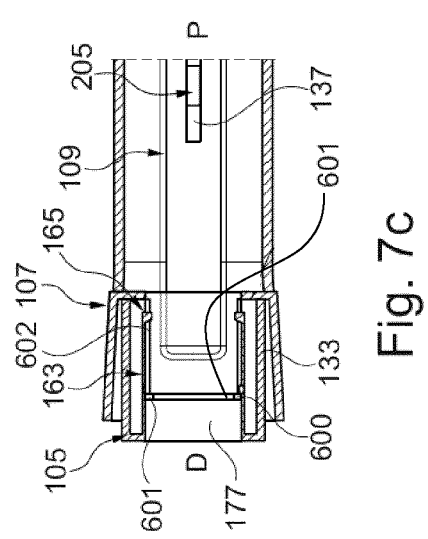

ARRANGEMENT FOR A DRUG DELIVERY DEVICE

CROSS REFERENCE TO RELATED APPLICATIONS

The present application is the national stage entry of International Patent Application No. PCT/EP2021/071612, filed on Aug. 3, 2021, and claims priority to Application No. EP 20315381.2, filed on Aug. 7, 2020, the disclosures of which are incorporated herein by reference.

TECHNICAL FIELD

The present disclosure relates to an arrangement for a drug delivery device.

BACKGROUND

Drug delivery devices, such as auto-injectors, are known in the art for dispensing a medicament to the injection site of a patient.

In EP 2 583 708 A1 a medicament delivery device is proposed which comprises a tubular operation member, a tubular extension part and a tubular activation member which are assembled in a housing.

SUMMARY

It is an object of the present disclosure to provide an improved arrangement for a drug delivery device.

This object is achieved by the subject-matter of the independent claims, where the dependent claims and the remaining disclosure may provide for advantageous embodiments and refinements. It should be noted that the disclosure is not restricted to the claimed concepts but pertains as well to all other concepts and embodiments disclosed herein independently of what is claimed. The scope of protection, however, is defined by the appended claims.

One aspect of the present disclosure relates to an arrangement for a drug delivery device. Another aspect of the present disclosure relates to a drug delivery device, which preferably comprises the arrangement. Therefore, features which relate to the arrangement do also apply for the drug delivery device and vice versa. As opposed to the arrangement, the drug delivery device may have a reservoir retainer configured to retain a reservoir within a housing and/or a reservoir, which, in some examples, comprises a medicament. The reservoir may be arranged in the reservoir retainer. The reservoir may be syringe, e.g., a syringe with a staked needle. The device may be an auto-injector. The arrangement may be a drive arrangement, i.e., an arrangement having components which operate during a dose deliver operation for which the arrangement is designed. It should be noted that the present disclosure is not restricted to the embodiments which are claimed and that the disclosure may contain other innovative concepts than the claimed ones. Specifically, features can be extracted from the specific context they are disclosed in and may be combined with other features. It goes without saying that features disclosed in conjunction with different embodiments may be combined with one another.

In an embodiment, there is provided an arrangement for a drug delivery device. The arrangement comprises:

a housing having a proximal end and a distal end, a longitudinal axis extending between the proximal end and the distal end, a blocking feature which is rotationally secured relative to the housing, a drive unit which can provide energy for a delivery operation of the arrangement, a rod which is operatively coupled to the drive unit and arranged to be moved distally relative to the housing in the delivery operation by the energy provided by the drive unit when the rod is released for the delivery operation, a movable trigger member, wherein the arrangement is configured such that the rod is rotatable relative to the housing and such that releasing the rod for the delivery operation involves rotating the rod relative to the housing into a release position, wherein the arrangement has an unprimed state and a primed state, in the unprimed state, the blocking feature is arranged to block a rotation of the rod into the release position, and in the primed state, a trigger member feature of the trigger member is arranged to block rotation of the rod into the release position, and wherein the trigger member is arranged to be movable relative to the housing in order to release the rod for the delivery operation, wherein, in order to switch from the unprimed state into the primed state, the trigger member is movable relative to the housing, and the arrangement is configured such that the movement is converted into an at least axial movement of the rod relative to the blocking feature, such that the blocking feature no longer blocks rotation towards the release position.

The moveable trigger member may be a needle cover which is movable axially along the longitudinal axis. Features disclosed in the following for the needle cover apply for the trigger member as well. The needle cover is movable relative to the housing and arranged to cover a needle during operation of the arrangement. The trigger member may be rotationally locked relative to the housing. The trigger member may react a part of the drive unit force in the first position which may be transferred to the trigger member via a rod release member. The trigger member may provide the interface to the user which is contacted by the user to trigger or initiate a dispensing operation. The trigger member may comprise a trigger member feature which may be a needle cover leg rib. The trigger member feature may has an L-like shape. The trigger member may have a sleeve-like portion which protrudes distally from the housing. One or more arms of the trigger member may extend axially towards the proximal end. The respective arm may be connected to a sleeve-like portion. The respective arm may be guided by a guiding portion in a region between the distal end of the housing and the trigger member feature of the trigger member. The guiding portion may be part of a drive unit holder, which may be fixed to the housing. Guiding the moveable trigger member axially along the longitudinal axis reduces possibly occurring torques acting on the moveable trigger member as the lever arm or leverage may be reduced as compared to a situation without a guiding portion. The drive unit holder may comprise the blocking feature which may be a drive unit holder sawtooth boss. The drive unit may comprise a drive spring, a gas powered drive means or other means to provide energy for a delivery operation of the arrangement.

In an embodiment in the unprimed state, the trigger member is operatively connectable to the rod such that proximal movement of the trigger member relative to the housing is converted into the at least axial movement of the rod, which may comprise a proximal movement relative to the housing. This operative connection may be via an interaction of a rod release member which may be mechanically connected or coupled to the rod and the trigger member. In case the rod release member moves axially and/or rotationally the rod is moving also axially and/or rotationally because they are mechanically connected. The trigger member is mechanically connected to the rod release member. For example if the trigger member moves in the unprimed state proximally the rod release member may also moves proximally. By such a movement the a release process may be initiated.

In an embodiment when switching from the unprimed state to the primed state, the rod is configured to rotate towards the release position, the rotation being stopped by the trigger member feature. The trigger member feature may mechanically interact with a collar firing boss which is arranged at the outer surface of the rod release member. They may be aligned axially towards each other that the rod release member is stopped from rotating. The movement of the rod may be used to drive the delivery of the medicament, e.g., from a reservoir of the drug delivery device. An accidental release of the rod, which would lead to an unwanted delivery operation may be avoided.

In an embodiment in the primed state the rod is rotationally biased towards the release position by the force of the drive unit. The rod is in the unprimed and in the primed state mechanically connected or coupled to the rod release member. When the rod release member moves in the distal direction it may interact with the blocking feature of the interface member. The blocking feature may comprise an oblique surface leading also to rotational movement of the rod release member. The oblique surface may be a sawtooth boss surface. The rotational movement of the rod release member leads to a position at which the rod is release from the rod release member and is moving in the distal direction driven by the force of the drive unit.

In an embodiment the trigger member is movable in a priming direction from a first position into a second position relative to the housing for switching the arrangement from the unprimed state to the primed state, and wherein the priming direction is the same direction into which the trigger member is moved for releasing the rod in the delivery operation. The priming direction may be an axial direction. For example, the priming direction may be a proximal direction.

In an embodiment a trigger member spring is arranged to bias the trigger member towards the first position when the trigger member is in the second position. The trigger member spring may be a needle cover spring which may be arranged to bias the needle cover, e.g., distally. Accordingly, when the trigger member is moved proximally relative to the housing the needle cover spring may be loaded and the force of the loaded spring may be used to drive the trigger member distally, e.g., once an element reacting the spring force, such as the skin of the user, is removed from the trigger member.

In an embodiment the blocking feature is axially and rotationally secured relative to the housing. The blocking feature may be arranged at the interface member so that it cannot move relative to the interface member. The blocking feature may be integrated to the interface member being a unitary part. The interface member my be fixed to the housing such that it is not movable relative to the housing. In this way the blocking feature can act to block movements of other parts of the arrangement from moving axially and/or rotationally relative to the housing. The interface member may be a drive spring holder. The blocking feature may be a drive spring holder sawtooth boss.

In an embodiment in the primed state and/or in the unprimed state, the rod is rotationally and axially secured to a rod release member by a rod release feature of the rod release member engaging a retention feature of the rod, such that, when switching from the unprimed state into the primed state, the rod release member moves together with the rod. The rod release member may be a collar. Accordingly, all further disclosures and features relating to the collar do apply to the rod release member as well and vice versa. The rod release feature may be a collar beam. Accordingly, all further disclosures and features relating to the collar beam do apply to the rod release feature as well and vice versa. The collar beam may be movably and/or resiliently connected to a sleeve-like main body portion of the collar. The collar and the collar beam are movable relative to the housing, i.e. they are not fixed to the housing. The collar beam may be configured to engage to rod retention feature of a rod, for example by means of a collar prong which may be arranged at the end of the collar beam. The plunger rod retention feature may be a notch arranged at the rod. The end of the collar beam may be a free end. There can be also two or more collar beams, collar prongs and/or notches accordingly. The prong may protrude radially, e.g., inwardly, from an axially extending portion of the collar beam.

In an embodiment the rod release member is arranged to interact with a blocking surface of the blocking feature in the unprimed state to block rotation of the rod. It is advantageous for avoiding an accidental release to rotationally secure the rod release member to the rod, so that the movement for releasing the rod is of a different kind than the movement of the rod after release which is axially. It is also advantageous alternatively or cumulatively to axially secure the rod release member to the rod, so that prior to the axial movement after release the rod undergoes another axial movement during the releasing process.

In an embodiment in the primed state, the rod release member, particularly a drive feature thereof, abuts a, helical, drive surface of the blocking feature, wherein the abutment is maintained by the drive unit. A helical movement as such is advantageous because a combined rotational and axial movement may be required for movement from a first into a second position. The risk of an accidental movement and a possible connected trigger- or release-movement is reduced.

In an embodiment in the delivery operation, the rod release member and the rod rotate together from an initial position into the release position, wherein, in the release position, the rod is released from the rod release member by disengaging the rod release feature from the retention feature and moves distally relative to the rod release member. The movement of the rod may be used to drive the delivery of the medicament, e.g., from a reservoir of the drug delivery device. Therefore, it should only occur if a delivery operation is wanted. Therefore, the release of the rod should be reliable and safe. The release of the rod may be subject to a movement of the collar which releases a collar beam from the rod. Without the pre-determined movement(s) of the collar the rod is not released. The movement of the collar may be initiated by the user of the drug delivery device. Therefore, an accidental release of the rod, which would lead to an unwanted delivery operation may be avoided. In particular, when the rod and the rod release member are secured to one another in the first position, they may both move relative to the housing when the rod release member is moved from a first position to a second position. Therefore, the rod and the release member may have a reliable relative position in the first position and during the movement from the first position into the second position.

Moreover, providing a rod release member in addition to the rod avoids having drive features such as protrusions or bosses on the rod which are provided to control the release of the rod. Such features are often provided at the proximal end of the rod and, if those features are dispensed with, the axial extension of a reservoir may be increased, for example, without having to increase the length of the device.

In an embodiment a trigger member priming surface is arranged to cooperate with the rod release member, e.g., with an oblique surface of a release member priming feature, when the arrangement is being switched from the unprimed state to the primed state. The release member priming feature may be arranged at the distal end of the outer surface of the release member. The release member priming feature may be a collar priming boss. The trigger member priming surface may be arranged at the proximal end of the trigger member. In an embodiment the trigger member priming surface is integrated into the trigger member feature. This construction provides mechanical stability.

In an embodiment when the arrangement is in the unprimed state, a proximal surface of the trigger member feature is arranged to transfer force to the rod in order to move the rod. The proximal surface of the trigger member may be a proximal surface of the needle cover leg rib. The proximal surface of the trigger member feature may apply a force to the release member priming feature in the proximal direction such that the rod release member moves in the proximal direction. Because the rod release member is mechanically connected or coupled to the rod, which is the case in the unprimed and primed state, the rod release member moves in the proximal direction due to the force of the trigger member, and also the rod moves in the proximal direction.

In an embodiment when the arrangement is in the primed state, an angular surface of the trigger member feature is arranged to block rotation of the rod into the release position. The angular surface of the trigger member feature may interact with a further feature which is also arranged at the outer surface of the rod release member. This further feature may be a collar firing boss, which may be arranged at the distal end of the rod release member. The rod release member is configured to move axially and/or rotationally. The collar firing boss which is fixed to the rod release member therefore is also configured to move axially and/or rotationally. The rod is in the unprimed and primed state mechanically connected to the rod release member and therefore is also configured to move axially and/or rotationally. When the axial position of the trigger member feature is overlapping with the axial position of the collar firing boss the trigger member feature may block the collar firing boss and subsequently the rotation of the rod release member. When the rod release member is blocked in its rotation also the mechanically connected rod is blocked from rotation. In this way the axial position of the trigger member can lead to a blocking of a rotation of the rod release member and the rotation of the rod, and as a result block the release process.

In an embodiment when the arrangement is in the primed state, a distal surface of the trigger member feature is arranged to block distal movement of the trigger member relative to the housing. When the axial position of the trigger member feature is proximal in relation to the axial position of the collar firing boss and the rotational or angular positions are overlapping the trigger member feature may be blocked by the collar firing boss of moving axially in the distal direction. The ensures that the trigger member can move distally only when the rod release member has passed pre-determined rotational or angular position, which is a condition for proceeding with the release process.

In an embodiment when the arrangement is in the primed state, the trigger member is biased in the distal direction. In the primed state the trigger member priming surface and the release member priming feature are rotationally aligned such that they are in mechanical contact and the release member priming feature is pushing in distal direction towards the trigger member priming surface caused by the drive unit. The drive unit is directly applying a force in distal direction towards the rod which is mechanically connected to the rod release member. Therefore the force applied to the rod is also applied to the trigger member in distal direction until to the rod is released of the rod release member which occurs in the release process.

In an embodiment the arrangement comprises a distal end stop surface which is axially, and in some examples also rotationally, secured relative to the housing and arranged to stop axial movement of the rod release member relative to the housing. The distal end stop surface may be arranged and integrated at the proximal end of the interface member. In this way the distal end stop surface is fixed to the housing as the interface member is fixed to the housing. In this way the trigger member covers the needle until the release process is enabled, and it is ensured that the needle is not accidentally un-covered.

"Distal" is used herein to specify directions, ends or surfaces which are directed or face towards the dispensing end of the drug delivery device or away from a proximal end. For example, the dispensing end of the device may be the distal end. On the other hand, "proximal" is used to specify directions, ends or surfaces which are directed or face away from the dispensing end of the drug delivery device. For example, the proximal end of the device may be the end furthest away from the dispensing or distal end.

In another aspect a drug delivery device is provided which comprises a arrangement and a reservoir, e.g., a syringe, which may comprise a medicament for injection. The reservoir, e.g., the syringe, may comprise a volume equal to or greater than 2.5 ml, in particular a volume of 3 ml.

In an embodiment the drug delivery device being a needle-based injection device with integrated non-replaceable container, where each container holds a single dose, whereby the entire deliverable volume is expelled when the device is operated for delivering the single dose. The drug delivery device may fulfil the requirements of ISO 11608-1, 3rd ed. 2014 Dec. 15.

BRIEF DESCRIPTION OF THE FIGURES

Embodiments will now be described, by way of example only, with reference to the accompanying drawings, in which:

FIG. 1A is a schematic drawing of components of an embodiment of a drug delivery device;

FIG. 2D is a side view of the case of the drug delivery device from a second direction, turned by 90 degrees around its longitudinal axis with respect to FIG. 2A-2C;

FIG. 2E is a schematic 3D drawing of the assembled drug delivery device in a transparent view from the second direction;

FIG. 2F is a schematic 3D cross-sectional drawing of the assembled drug delivery device from the second direction;

FIG. 5A is a schematic cross-sectional drawing of the collar beams flexed outwards;

FIG. 5B is a schematic cross-sectional drawing of a section of the drug delivery device;

FIG. 5C is a schematic cross-sectional drawing of the drug delivery device;

FIG. 7A is a schematic drawing of a section of the drug delivery device in an unprimed state;

FIG. 7B is a schematic drawing of a section of the drug delivery device in a primed state;

FIG. 7C is a schematic drawing of a section of the drug delivery device at the distal end showing the cap being removed when the delivery operation has been initiated;

FIG. 7D is a schematic drawing of a section of the drug delivery device after the dose delivery operation has been completed and the needle cover has been locked;

DETAILED DESCRIPTION

Figure 1B:
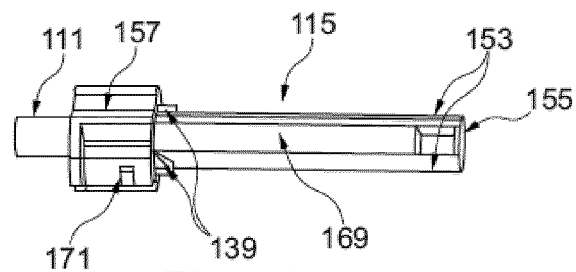
FIG. 1B is a schematic three-dimensional drawing of the drive spring holder in a first view.

The same reference numbers apply to the same features throughout the figures and the following explanations.

An embodiment of a drug delivery device is described in the following with reference to FIGS. 1A to 7D.

FIG. 1A is a schematic drawing of components of the drug delivery device 100, in particular of an auto-injector. The device comprises a housing or case 201 (shown for example in FIG. 2A), which is depicted as comprising a front case 107 and a rear case 121. A multi-part case may be advantageous from an assembling perspective. The drug delivery device 100 further comprises a cap 101 which may be attached to the case, e.g., to the front case 107. Instead of a multi-part case, a unitary case may be employed as well.

The case 201 is adapted to hold a medicament container, such as a syringe 109. The syringe 109 may be a pre-filled syringe and comprises a needle for injecting a medicament. The reservoir, e.g., the syringe, may receive a medicament having a volume equal to or greater than 2.5 ml. The needle may be covered by a protective needle shield 125, which is why the needle is not visible in FIG. 1A. The needle is disposed at the distal end of the syringe. A proximal end of the syringe may be closed by a movable bung or stopper 129 (see FIG. 2B, for example) which is movably retained in a syringe barrel 127 of the syringe 109. When the stopper is displaced in the distal direction, i.e. towards the needle, the liquid content of the barrel may be dispensed from the syringe via the needle. Instead of the syringe, a cartridge with or without a pre-mounted needle may be provided as a drug or medicament container or reservoir. The cap 101 may include a grabber 103 (e.g., a barb, a hook, a narrowed section, etc.) which can act as a removal mechanism for the needle shield 125. The cap 101 may comprise grip features (not shown) for facilitating the removal of the cap 101 (e.g., by twisting and/or pulling the cap 101 relative to the case 201). When the drug delivery device 100 and/or the syringe 109 are assembled, the protective needle shield may be removably coupled to the needle and/or the syringe. The needle shield may be interlocked with the cap, e.g., via the grabber, and removed together with the cap to prepare the device for operation.

The device comprises a needle cover 105 which may be movably retained within the case 201, e.g., telescopically. The needle cover 105 may be arranged to cover the needle, such as, for example, when the needle shield has been removed and/or when the delivery operation has been completed. The needle may be the one comprised by the syringe or one provided in the case when a cartridge without a pre-mounted needle is used as container or reservoir. The needle cover may function as a trigger member, which, when moved relative to the case from an initial position, e.g., in the proximal direction, triggers the dose delivery operation which may be spring-driven. Alternatively, another member, such as a button, may be provided as trigger member (not illustrated).

The device further comprises a needle cover spring 119, which may be arranged to cooperate with the needle cover 105 in the drug delivery device. The needle cover spring may be arranged to bias the needle cover, e.g., distally. Accordingly, when the needle cover is moved proximally relative to the housing the needle cover spring may be loaded and the force of the loaded spring may be used to drive the needle cover distally, e.g., once an element reacting the spring force, such as the skin of the user, is removed from the needle cover 105.

A plunger rod 111 of the device is arranged to be driven by a drive spring 113 of the device, e.g., a compression spring and/or a helical spring. When the plunger rod 111 moves distally relative to the syringe, the medicament in the syringe is dispensed from the device. The plunger rod may move distally relative to syringe and case under the force of the drive spring during the delivery operation. The drive spring may be pre-loaded. The entire force that may be required to move the plunger rod may be provided by the pre-load in the drive spring. No loading or setting operation may be required. The container may contain an amount of medicament, which is sufficient for only one delivery operation. Thus, the device may be a, e.g., disposable, device for administering a single dose of medicament. The drive spring force, e.g., the force with which the drive spring is pre-loaded, may be greater than or equal to any one of the following values: 20N, 25N, 30N, 45N or even higher.

The device 100 further comprises a collar 117. The collar is arranged to be operatively connected to a drive spring holder 115 of the device 100 as will become apparent from the further explanations below. The drive spring holder 115 provides a cavity in which the drive spring 113 is received. The cavity may be provided by a sleeve-like portion of the drive spring holder 115. The drive spring 113 is at least partly received in the drive spring holder 115. A proximal surface of the drive spring may abut a distal surface of the drive spring holder 115. The drive spring holder 115 may react the force of the pre-loaded drive spring.

The plunger rod 111 serves for transferring the force of the drive spring 113 to the syringe 109, particularly the stopper 129. The drive spring may be retained between a proximal facing surface of the plunger rod 111, e.g., an inner surface, and a distally facing surface of the drive spring holder 115. The syringe barrel and the needle may be axially secured in the case, e.g., by means of an appropriate bearing surface provided in the interior of the case or by means of an additional syringe holder. The drive spring 113 is arranged within the plunger rod 111 biasing the plunger rod 111 in the distal direction. In another exemplary embodiment, the plunger rod 111 may be solid and the drive spring 113 may engage the plunger rod at a proximal end of the plunger rod 111. Likewise, the drive spring 113 could be wrapped around the outer diameter of the plunger rod 111 and extend within the syringe 109. The needle cover spring 119 may be operatively coupled between the needle cover 105 and the collar 117.

When the drug delivery device 100 is assembled all components shown in FIG. 1A are joined along a longitudinal axis X which is hinted in the explosion view in FIG. 1A by the dashed line. In the assembled state, the axis X extends between the proximal end P and the distal end D of the device.

FIG. 1B is a schematic three-dimensional drawing of the drive spring holder 115 and the plunger rod 111 in a first view. The drive spring holder 115 comprises a drive spring holder ring or ring portion 167 (see FIG. 1C) and two drive spring holder arms 153 which extend from the drive spring holder ring portion 167 defining a, e.g., cylindrical, drive spring holder cavity 169. Instead of the drive spring holder arms 153, a drive spring holder sleeve portion may be provided. The ring portion may protrude radially beyond the arms or the sleeve portion such that a proximally facing surface of the drive spring holder is provided which may define an axial end stop for the collar 117. The proximally facing surface may be configured to react the drive spring force in a pre-assembled unit, in which the drive spring may be loaded already. This unit may comprise the collar, the plunger rod, the drive spring and the drive spring holder. The plunger rod 111 may be retained in the drive spring holder 115. The plunger rod 111 may be arranged in the drive spring holder cavity. The drive spring holder arms 153 are connected at their endings remote from the ring portion by a drive spring holder disc portion 155. The drive spring holder, e.g., the disc portion, may react the drive spring force, e.g., during the operation of the device or when the plunger rod, the drive spring holder, the drive spring and the collar are assembled as a unit before the unit is assembled with the remaining parts of the device. The drive spring holder ring portion 167 comprises, e.g., at its outer lateral surface, two drive spring holder rails or slots 157. The rails or slots 157 are arranged to cooperate with needle cover legs 131 (see further below) to axially guide the movement of the needle cover legs. In other words, the legs 131 can move only along the axis X and relative rotation between the legs 131 and the drive spring holder is prevented or at least blocked. Further, the drive spring holder ring 167 comprises one or more drive spring holder sawtooth bosses 139. The bosses are angularly separated. The bosses may extend from the proximally facing surface of the drive spring holder ring portion, e.g., in the proximal direction. The bosses 139 may be placed at an area of the drive spring holder ring 167 facing a distal surface of the collar 117, e.g., in the area where the drive spring holder arms 153 are emerging from the drive spring holder ring 167. The drive spring holder sawtooth bosses 139 may be provided to interact with one or more collar tongues 145 as will be described further below. Further the drive spring holder 115 comprises a fixing portion or feature 171, e.g., one or more radially oriented protrusions, for fixing the drive spring holder 115, expediently rotationally and axially, to the case 201, in particular to the front case 107, e.g., via a snap fit. The fixing portion or feature 171 may be provided on an outer lateral surface of the ring portion. A portion of the needle cover legs 131 may be arranged in a region between the inner wall of the case and an outer wall of the drive spring holder, e.g., of its ring portion, in the drug delivery device.

Figure 1C:
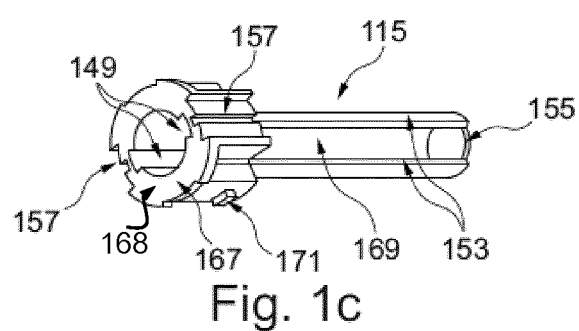
FIG. 1C is a schematic three-dimensional drawing of the drive spring holder in a second view.

FIG. 1C is a schematic three-dimensional drawing of the drive spring holder 115 in a second view, showing drive spring holder grooves 149 at the inner radius of the drive spring holder rail 157 in which collar beams 141 of the collar 117 in a connected state can flexibly move radially outwards as described in conjunction with FIG. 5A below. Further the drive spring holder ring 167 comprises at its proximal end a distal end stop surface 168 which stops the collar 117 from moving further in the distal direction.

Figure 1D:
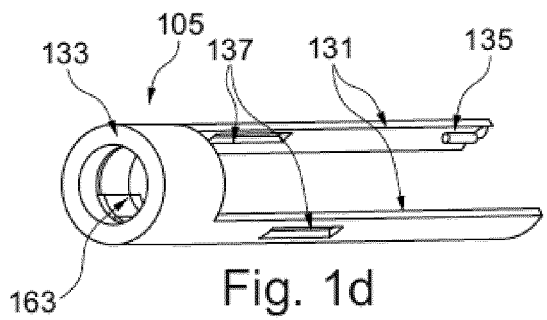
FIG. 1D is a schematic three-dimensional drawing of the needle cover.

FIG. 1D is a schematic three-dimensional drawing of the needle cover 105 comprising two, e.g., rectangular shaped, needle cover legs 131 extending parallel to each other away from a, e.g., cylindrically shaped, front section 133 of the needle cover 105. The needle cover legs may be elongated. At or near their proximal ends the needle cover legs 131 comprise needle cover leg ribs 135. The needle cover leg ribs may face inwardly and/or face one another. The needle cover leg ribs 135 may interact with the ramped collar priming bosses 147, see FIGS. 1F, 3A and 4A. The needle cover legs 131 further comprise, e.g., rectangular, needle cover cutouts 137 which can connect or interact with guide features or serrate sections 205 of the front case 107. The needle cover 105 further comprises needle cover lock arms 163 with needle cover ramps or lock features 165. The needle cover lock arms are located in the interior of the ring-shaped front section 133. The needle cover lock arms with the lock features 165 may can block the needle cover 105 from movement in the proximal direction by abutting a front wall 601 of the case 201, as shown and explained in more detail in FIG. 6A.

Figure 1E:
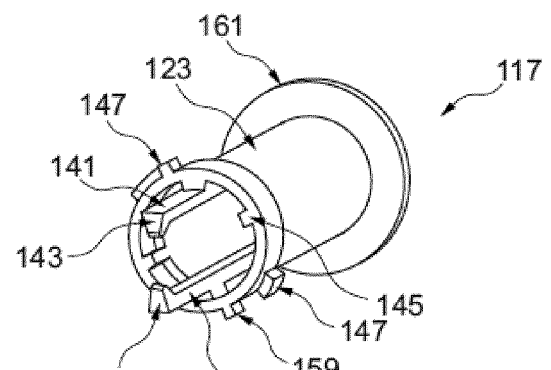
FIG. 1E is a schematic three-dimensional drawing of the collar.

FIG. 1E is a schematic three-dimensional drawing of the collar 117. The collar comprises a collar tube portion 123, which may be circumferentially closed, where this is not necessary for the functionality. It may, however, be advantageous as, in this case, access to components in the interior of the collar is prevented. This is of a particular advantage, if the collar defines a section of the outer surface of a pre-assembled unit as discussed above. At the proximal end of the collar tube 123 a circular edge or flange 161 is provided. The edge or flange 161 may protrude radially beyond the tube portion 123. The edge or flange 161 may provide a bearing surface for the needle cover spring 119. The opposite bearing surface of the needle cover spring 119 may be formed by the end of the needle cover legs 131. At the distal end of the collar tube portion 123 two collar beams 141 are provided which extend axially away from the collar tube portion 123, e.g., along the axis X. At the free ends of the collar beams 141 collar prongs 143 are provided which are directed radially inwardly and/or towards each other. The collar prongs 143 are shaped with a ramp on a proximal surface. The ramp may have a slope, which defines an angle less than 90° with the axis X as seen in the proximal direction. The distal surface of the prongs may extend perpendicularly relative to the axis X. At the distal side of the collar tube 123 one or more collar tongues 145 are provided at the inner radius of the collar tube 123. For example at the distal side of the collar tube 123, at least one ramped collar priming boss 147 is provided, at the outer surface of the collar. Further, at least one collar firing boss 159 is provided to interact with the needle cover leg ribs 135 of the needle cover legs 131 is provided at the outer surface of the collar, e.g., at the collar tube 123. A plurality of priming bosses and firing bosses may be provided. The collar priming boss 147 and the drive spring holder sawtooth boss 139 may have ramped surfaces which angularly face one another or face in opposite angular directions. The slopes of the ramped surfaces of the priming boss and of the drive spring holder sawtooth boss may be helical and/or the ramped surfaces may be inclined in the same direction. The ramped surface of the priming boss may face, e.g., partly or predominantly, in the distal direction. The ramped surface 173 of the sawtooth boss may face, e.g., partly or predominantly, in the proximal direction.

Figure 1F:
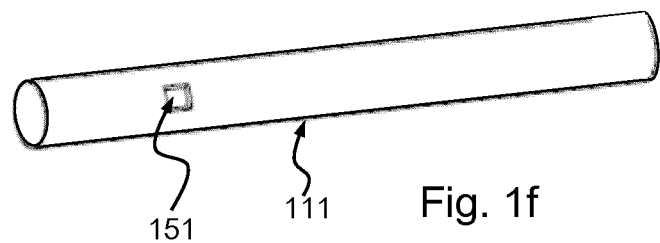
FIG. 1F is a schematic three-dimensional drawing of the plunger rod.

FIG. 1F is a schematic three-dimensional drawing of the rod with a notch 151. The notch 151 has a quadratic opening but it can also have any other shape, e.g., rectangular or circular.

Figure 1G:
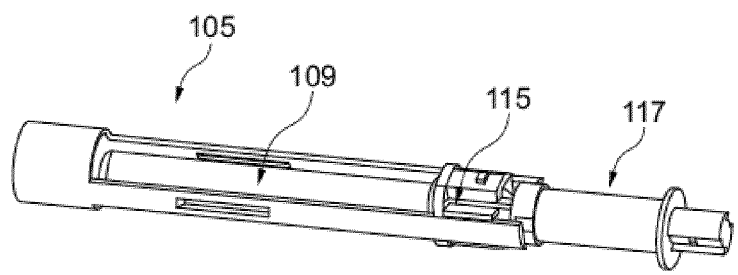
FIG. 1G is a schematic three-dimensional drawing of the needle cover, drive spring holder, syringe and collar in an assembled state.

FIG. 1G is a schematic three-dimensional drawing of the needle cover 105, the drive spring holder 115, the collar 117 and the syringe 109 in an assembled state. The syringe 109 is operatively connected to the plunger rod 111 and the drive spring 113 so that the plunger rod can transfer the force of the drive spring 113 to the stopper in the syringe 109. The needle cover leg ribs may interact with the collar firing bosses (not explicitly shown).

Figure 1H:
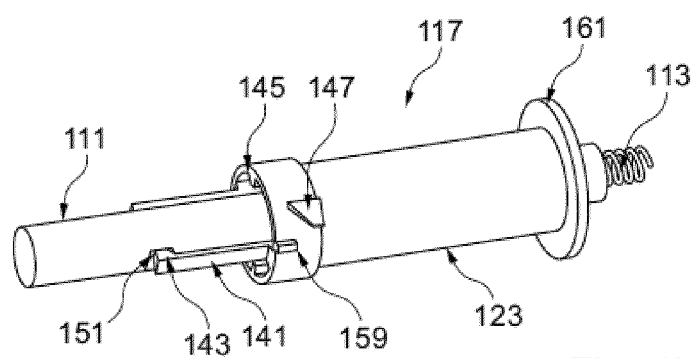
FIG. 1H is a schematic three-dimensional drawing of the collar, plunger rod and drive spring in an assembled state.

FIG. 1H is a schematic three-dimensional drawing of the collar 117, the plunger rod 111 and the drive spring 113 in an assembled state. The plunger rod 111 is cylindrically shaped and hollow forming a cylindrical cavity which extends along the axis X and which is closed at its distal side. The drive spring 113 which is also generally cylindrically shaped is arranged within the cavity of the plunger rod 111. The collar prongs 143 of the collar beams 141 are directed radially inwardly and are interlocked with notches 151 of the plunger rod 111. As long as this interlock is established, the collar and the plunger rod are axially and rotationally locked to one another.

Figure 2A:
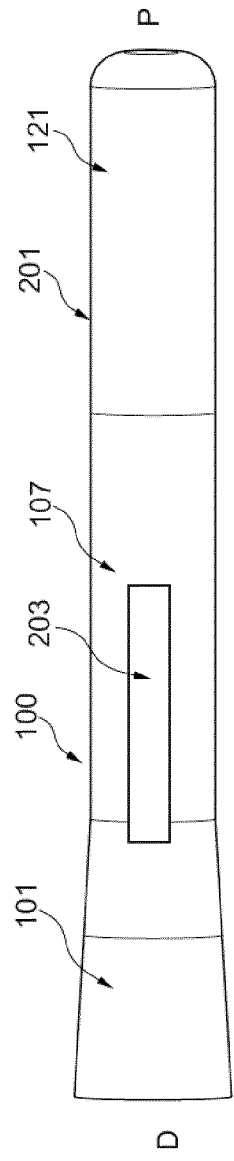
FIG. 2A is a side view of the case of the drug delivery device from a first direction.
Figure 2B:
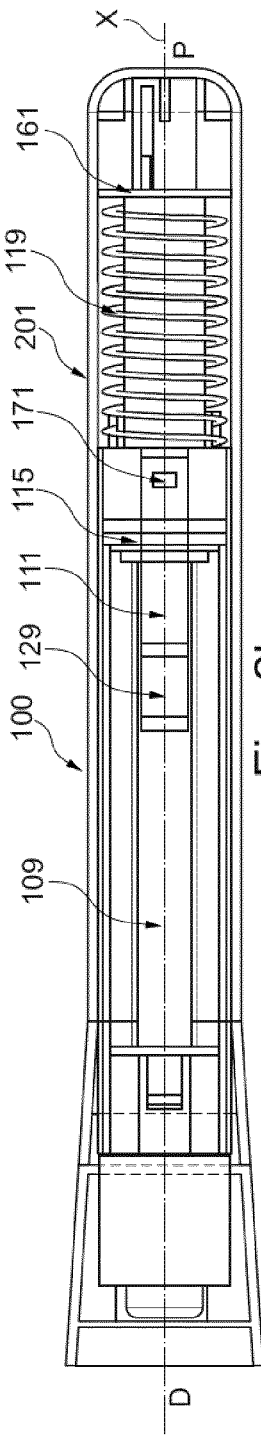
FIG. 2B is a schematic 3D drawing of the assembled drug delivery device in a transparent view from a first direction.
Figure 2C:
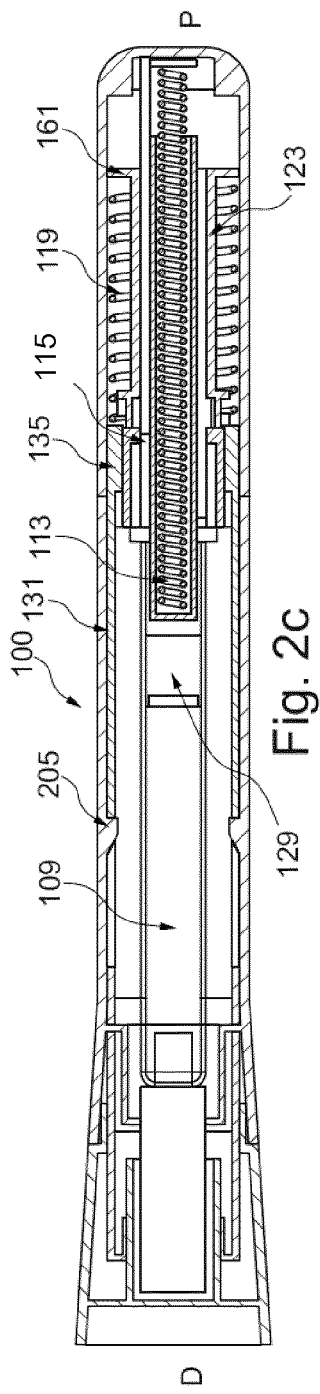
FIG. 2C is a schematic 3D cross-sectional drawing of the drug delivery device from a first direction in an assembled state.

FIGS. 2A-2C show the drug delivery device 100 from the same perspectives and in the same state. The state may be a state where the device is ready to be used for an injection operation, e.g., out of the box.

FIG. 2A is a drawing of a side view of the case 201 of the drug delivery device 100 showing the cap 101, the front case 107 and the rear case 121. The front case 107 comprises one or more viewing windows 203 which allow a visual inspection of the syringe 109, e.g., to verify that there is still sufficient medicament in the syringe or that the device has not yet been operated or the integrity of the drug compound prior to use. The viewing windows 203 are located on opposite sides of the front case 107 with regard to the axis X, which allow the visual inspections outlined above and additionally an inspection of the optical clarity of the drug.

FIG. 2B is a schematic three-dimensional drawing of the assembled drug delivery device 100 in a primed condition or state ready for a dispensing or delivery operation, wherein the case 201 is transparent along the axis X. It shows the syringe 109 and the plunger rod 111. It further shows the drive spring holder 115 from which the plunger rod 111 protrudes in the distal direction, and the portion 171 for fixing the drive spring holder 115 to the case 201. It further shows the needle cover spring 119 surrounding the outer radius of the collar tube portion 123 and being confined by the collar circular edge or flange 161 at the proximal side of the collar tube portion 123.

FIG. 2C is a schematic cross-sectional drawing of the drug delivery device 100. It shows the syringe 109 and the drive spring 113 next to it. The drive spring 113 is covered by the plunger rod 111. It also shows a cross-section of the needle cover spring 119 and collar tube 123 wherein the needle cover spring 119 is confined in its expansion in the proximal direction by the collar circular edge 161 of the collar tube 123 and distally by the needle cover legs 131. Further are shown the needle cover leg ribs 135 of the needle cover 105 guided in the drive spring holder slots 157 of the drive spring holder 115. The front case 107 comprises serrate sections 205 which interact with the, e.g., rectangular, needle cover cutouts 137 of the needle cover 105 such that the needle cover 105 is secured in the rotational or angular direction by the serrate sections 205 but can only move along the axis X by a distance limited by the length of the needle cover cutout 137, particular at least in the distal direction.

FIGS. 2D-2F show the views of the drug delivery device 100 similar to the ones above, where, however, the device is rotated by 90 degrees around its longitudinal axis compared to the view in FIGS. 2A-2C.

FIG. 2D is a schematic cross-sectional drawing of the case 201 of the drug delivery device 100 showing the cap 101, the front case 107 and the rear case 121. The viewing windows 203 of the front case 107 are only indicated by indentations in the drawing.

FIG. 2E is a schematic three-dimensional drawing of the assembled drug delivery device 100 wherein from the viewing side the case 201 is transparent along the longitudinal axis, analogue to FIG. 2B. It is shown a needle cover leg 131 of the needle cover 105 with the needle cover cutout 137. The serrate section 205 of the front case 107 intercepts with the, e.g., in top view rectangular, needle cover cutout 137 of the needle cover 105 such that the needle cover 105 is secured in the rotational direction and can only move in the direction of the axis X according to the length of the needle cover cutout 137. In FIG. 2E the serrate section 205 is located close to the proximal end of the needle cover cutout 137, such that the needle cover 105 can move towards the collar 117, i.e., proximally. This movement will happen when the user triggers the delivery operation to apply the medicament contained in the syringe 109. Before the delivery operation is triggered that cap 101 and the needle shield are removed as has been explained further above. When the needle cover is moved proximally, the needle will protrude from the device and can be introduced into the target tissue.

Further, FIG. 2E shows a part of the drive spring holder 115 connected with a needle cover leg 131 and collar tube 123. The collar tube 123 is surrounded along the axis X by the needle cover spring 119. It further shows the drive spring holder 115, the needle cover spring 119 and the collar tube 123.

FIG. 2F is a schematic cross-sectional drawing of the assembled drug delivery device 100 in a view from the same direction as in FIG. 2E. It is also shown a needle cover leg 131, opposite to the needle cover leg of FIG. 2E with respect to the axis X, the syringe 109 and the drive spring 113 next to it. The needle is not shown for the purposes of better illustration. The drive spring 113 is covered by the plunger rod 111. It is also shown a cross-section of the needle cover spring 119 and the collar 117. It further shows the fixing portion 171 for fixing the drive spring holder 115 to the case 201. It is also shown a part of the plunger rod 111 and the drive spring 113, which is located in the cylindrical cavity of the plunger rod 111. The drive spring abuts a proximal surface of the plunger rod, e.g., near the distal end of the drive spring, and a distal surface of the drive spring holder, e.g., of the drive spring holder disc portion 155.

Figure 3A:
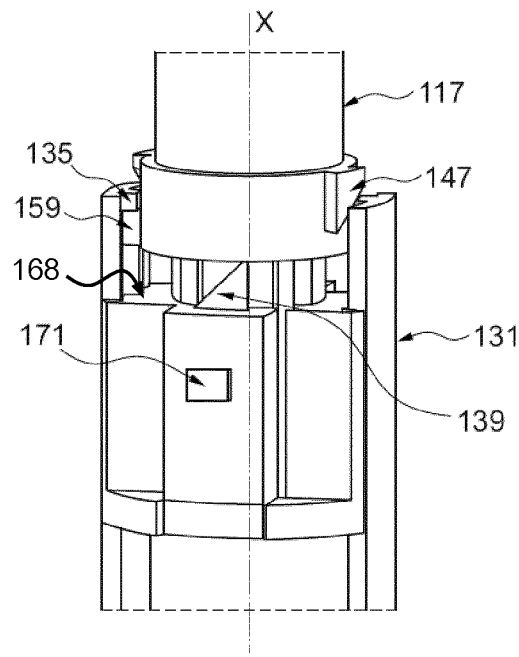
FIG. 3A is a schematic 3D drawing of the collar and the needle cover legs at the priming step.

FIG. 3A is a schematic 3D drawing of the collar 117 and the needle cover leg rib 135 of the needle cover 105 in the primed position or state. In this state the drug delivery device 100 is adjusted such that a user can initiate a release process which leads to the injection of a medicament. In other words: When the device is in the primed state, a delivery operation of the device can be initiated. When the user wants to use the device he removes the cap 101 from the case 201 which at the same time removes the protective needle shield 125 from the needle. Once the cap 101 has been removed the needle cover may be moved relative to the collar and the case to trigger the injection. Before triggering the injection, the needle cover, in particular a distal surface thereof, may contact the user's skin and, for triggering, the case is moved in the distal direction. This applies a force to the needle cover 105 which then moves in the proximal direction relative to the collar. While the needle cover moves proximally, the needle may penetrate the skin of the user. The proximal movement of the needle cover activates a release mechanism such that the drive spring 113 is enabled to drive the plunger rod distally relative to the case and the syringe. The primed state is a state which is established by the manufacturer of the drug delivery device 100, so that the device is sold in a condition ready to use and no user priming steps may be required.

Before the device is prepared to be in the primed position or state, the device 100 is in a so-called un-primed position or state. In this un-primed state one or more locking mechanisms are in place which ensure that an accidental release of the plunger rod is avoided. A sub-arrangement comprising plunger rod, drive spring, collar and/or drive spring holder may be in this position or state already when it is connected with other parts of the device during the assembling process. Therefore, the drive spring may be kept reliably in a tensioned state until the device is brought into the primed state, which is the condition ready to release the plunger rod. Accordingly, the un-primed state may be maintained until the device 100 is completely assembled and the primed position is established for sale and use.

In the presently proposed mechanism, the needle cover may be used for switching from the un-primed state to the primed state. The needle cover 105 is movable axially relative to the case 201 along the longitudinal axis X, in particular in the proximal direction. The collar 117 is axially and rotationally movable relative to the case 201. The drive spring holder 115 is fixed with the fixing portion 171 to the case 201 and is a member separate from the case 201 but axially and rotationally secured to the case 201. The needle cover leg ribs 135 of the needle cover 105 are in mechanical contact with the ramped collar priming bosses 147 or can be brought into contact with the ramped collar priming bosses 147 when the needle cover 105 is moved proximally when the device is switched from the unprimed state to the primed state, i.e., when the priming operation is performed. In FIG. 3A the priming operation has been performed already, i.e the device is in the primed state ready for performing the delivery operation.

Figure 3B:
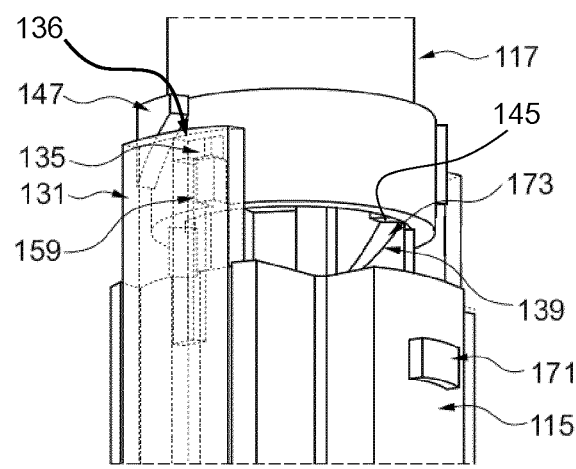
FIG. 3B is a schematic 3D drawing of the collar, the needle cover legs and the drive spring holder at primed position.
Figure 3C:
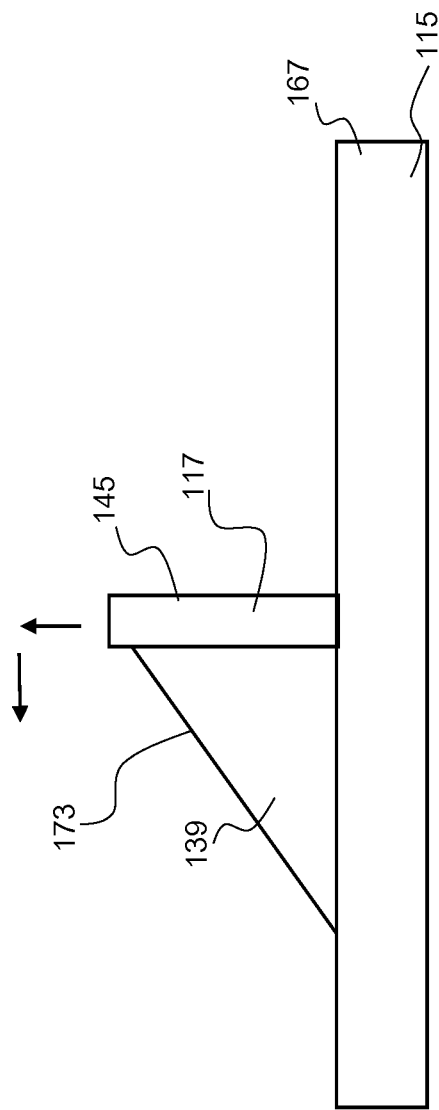
FIG. 3C schematically illustrates an unprimed state.
Figure 3D:
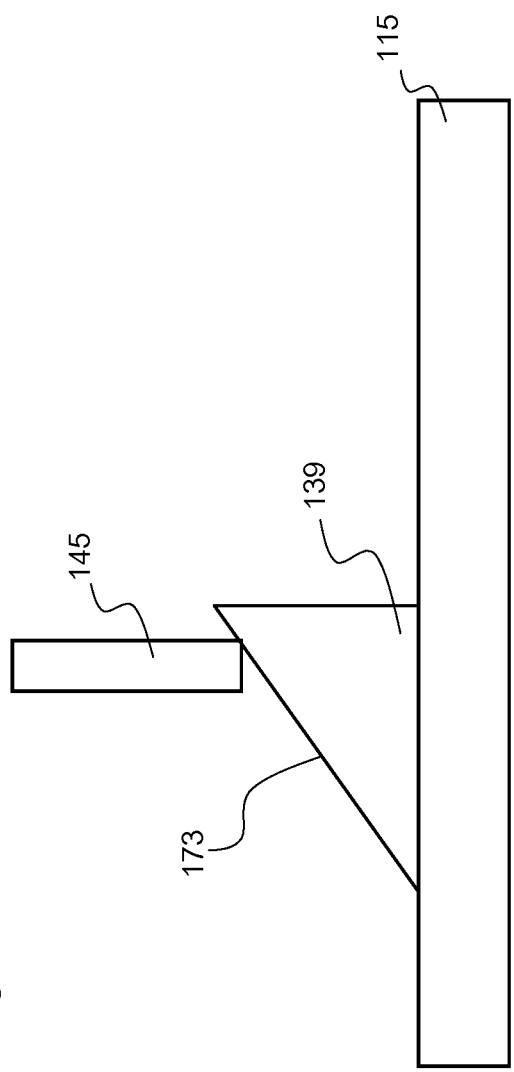
FIG. 3D schematically illustrates a primed state.

The unprimed state is illustrated very schematically by way of FIG. 3C. As is depicted, the collar 117 axially abuts the drive spring holder 115. Thus, the force of the drive spring which may also act on the collar, cannot move the collar distally relative to the drive spring holder 115 as the drive spring holder is secured to the case axially and, in some examples, also rotationally. The collar 117 is merely represented by one feature, e.g., the collar tongue 145. It should be appreciated, that the axial abutment between the drive spring holder 115 e.g., the drive spring holder ring 167 and the collar may also be effected by a larger surface area of the collar such as the distal rim of the collar circumferentially contacting the drive spring holder, e.g., the drive spring holder ring 167. However, for priming purposes, the key features which of the collar 117 and the drive spring holder 115 are the collar tongue 145 and the drive spring holder sawtooth boss 139, which is why FIG. 3C shows these components.

When the needle cover 105 is moved in the proximal direction along the axis X, for priming the device, the collar 117 and the plunger rod 111 (not shown), which is slaved to the collar as will be explained below, until the plunger rod is released from the collar, are also pushed in the proximal direction along the axis X on account of the engagement of the needle cover with the priming bosses 147, which transfers an axial force and a rotational force to the collar 117 due to the ramps are oblique surfaces of the priming bosses. It should be noted, that, instead of having a plurality of priming bosses, one priming boss 147 may be sufficient. If the collar tongue 145 already angular abuts the drive spring holder sawtooth boss 139 when the axial and rotational force is imparted to the collar, the movement of the needle cover causes, on account of the block rotational movement, and axial movement of the collar 117 in the proximal direction relative to the case and/or the drive spring holder 115. If there is not yet an angular abutment between, the collar and the drive spring holder, the collar may be moved axially and rotationally relative to the drive spring holder 115 on account of the forces transferred to it via the needle cover and the priming boss. However, independent of whether there is an abutment already when the needle cover in cooperation with the priming boss starts to transfer axial and rotational forces to the collar, after the collar 117 and, particularly, the collar tongue 145 has cleared axially the drive spring holder sawtooth boss 139, rotation of the collar relative to the drive spring holder is no longer blocked and a rotational movement of the collar 117 relative to the case and the drive spring holder 115 occurs. The axial and rotational movements of the collar are symbolized in FIG. 3C by the arrows.

The needle cover legs 131 are guided by the drive spring holder rails 157, which are arranged at the outside of the drive spring holder ring portion 167, along the axis X. The drive spring holder 115 is fixed to the rear case 121 by the fixing portion. The collar 117 and the plunger rod 111 are held together by the collar beams 141 and its collar prongs 143 which are locked into the notches 151 of the plunger rod 111. When the drive spring holder sawtooth boss 139 is axially overlapping with the collar tongue 145 (see FIG. 3C) of the collar 117, the collar 117 is not able to rotate around the axis X in the direction and/or position which may be required to release the plunger rod (e.g., to the left in FIG. 3C) as this rotation is or can be blocked by the collar tongue 145 abutting the sawtooth boss 139. When the needle cover 105 is moved further in the proximal direction and the collar 117 is moved in the proximal direction as well, at some point the collar tongue 145 has axially cleared the drive spring holder sawtooth boss 139 which allows rotational movement in the direction that may be required to release the plunger rod as this rotation is no longer blocked by the drive spring holder sawtooth boss 139. At this stage the collar tongue 145 can no longer abut the drive spring holder sawtooth boss 139, in particular the sawtooth boss surface 173 thereof, and the collar 117 together with the plunger rod 111 are able to rotate around the longitudinal axis X. The force of the drive spring may maintain the collar tongue 145 and the drive spring holder sawtooth boss 139 axially in abutment also in the primed state which has been now achieved and which is, as far as the components depicted in FIG. 3C are concerned, schematically illustrated in FIG. 3D. The spring force of the drive spring still acts on the collar 117 and tries to move the collar distally relative to the drive spring holder and/or the case. On account of the oblique surface 173 of the sawtooth boss 139 which the collar tongue 145 now abuts, the distally directed force of the drive spring tends to rotate the collar 117 in the direction defined by the sawtooth boss surface 173, which is to the left in FIG. 3D. This direction may be the direction in which rotation is required to release the plunger rod for a delivery operation. However, rotation of the collar and the plunger rod, which is slaved to it in the primed state, in that direction may be blocked by another component, such as, for example, a movable component, such as the needle cover 105 which is discussed further below.

FIG. 3B is a schematic three-dimensional drawing of the collar 117, the drive spring holder 115 and the needle cover legs 131 of the needle cover 105 in a primed state or position. When the collar tongue 145 applies a force which originates by the drive spring 113 to the drive spring holder sawtooth boss 139 because of the ramped shape of the sawtooth boss surface 173 of the drive spring holder sawtooth boss 139 this applied force tends to cause or causes a rotation of the collar 117 around the longitudinal axis X, particularly in the direction defined by the ramp, e.g., clockwise as seen from the proximal end.

The rotation of the collar 117 is stopped or blocked when the collar firing boss 159 of the collar gets in contact with the needle cover leg rib 135 which overlap in their positions at least partially axially. The collar firing boss 159 of the collar 117 then prevents the collar 117 from rotating further around the longitudinal axis X as the needle cover leg is locked rotationally relative to the housing or case 201 and the collar firing boss 159 abuts the needle cover leg rib 135. Thus, the collar cannot rotate in that direction which it would have to rotate for the delivery operation—in FIG. 3B this direction is clockwise as seen from the proximal end of the collar 117—as this rotation is blocked by the needle cover 105. Starting from the primed position, as outlined above, a delivery operation can be triggered, e.g., via the needle cover which acts as trigger member as will be explained below in more detail. The needle cover reacts a part of the drive spring force which is transferred to it via the collar 117. In the primed position, the collar is in mechanical coopera-tion with the drive spring holder sawtooth boss 139, e.g., the ramp shaped surface 173 thereof.

The needle cover leg rib 135 may provide an angularly oriented surface which abuts the collar firing boss 159 in the primed position. Thus, the leg rib 135 blocks rotation of the collar 117 to avoid an accidental release of the plunger rod. The needle cover leg rib(s) may have a distally oriented surface which in the primed position abuts a proximally facing surface of the collar. In this way a distal movement of the needle cover relative to the case and the collar may be prevented. The distally facing surface may be a surface of the leg rib 135. The angularly facing surface and the distally facing surface may be implemented by an L-shaped geometry of the leg needle cover leg rib 135 as depicted in FIG. 1D, for example.

Figure 4A:
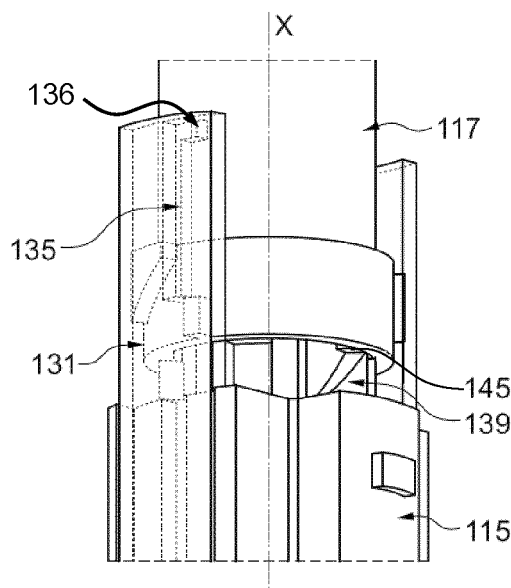
FIG. 4A is a schematic 3D drawing of the collar, the drive spring holder and the needle cover legs.

FIG. 4A is a schematic three-dimensional drawing of the collar 117, the drive spring holder 115 and the needle cover legs 131 of the needle cover 105 after the cap 101 is removed from the case 201 and the delivery of the injection fluid or medicament is initiated. Once the cap 101 is removed the user can press the needle cover 105 in the proximal direction which then moves in the proximal direction along the longitudinal axis X, e.g., along the drive spring holder, such as along the drive spring holder rail 157. The needle cover leg rib 135 is then moved as well in the proximal direction, reaching a point where it does not overlap in its position axially with the collar firing boss 159 such that the collar 117 and the plunger rod 111 are no longer blocked from further rotation. The plunger rod 111 and collar 117 then rotate together on account of the rotational interlock provided by the collar beams. This rotation originates from the force of the drive spring 113 which acts in the distal direction tends to move the plunger rod 111 distally. As the plunger rod 111 is mechanically connected to the collar 117 the collar 117 is also pushed in the distal direction. The collar 117 can move in the distal direction when the collar tongue 145 is at a rotational position where it abuts the ramp of the drive spring holder sawtooth boss 139. Because of the ramped shape of the drive spring holder sawtooth boss 139 a helical movement of the collar 117 occurs such that the collar 117 rotates around the longitudinal axis X and moves in the distal direction along the longitudinal axis X at the same time. The movement may be helical. As the plunger rod is also axially locked to the collar, the plunger rod also moves helically.

Figure 4B:
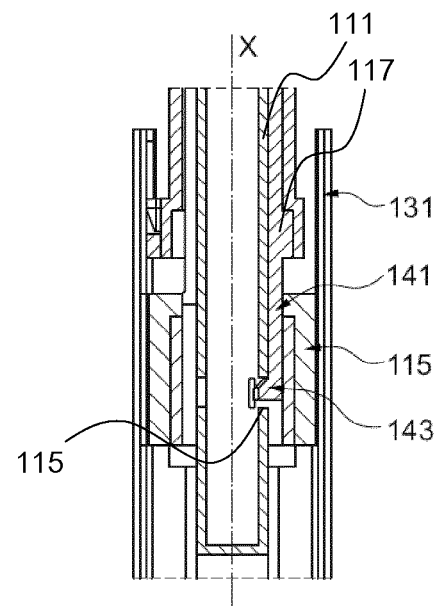
FIG. 4B is a schematic cross-sectional drawing of the collar beams being connected with the plunger rod.

FIG. 4B is a schematic cross-sectional drawing of the collar 117 being connected with the plunger rod 111. The collar prong 143 of the collar beam 141 interacts with the notch 151 of the plunger rod 111 such that the plunger rod 111 and the collar 117 move together axially and rotation-ally. In this status the drive spring 113 force is compensated or reacted by the collar beams. The drive spring holder ring 167 of the drive spring holder 115 supports the collar beams 141 radially (although only one beam is depicted two or more than two beams may be provided) such that those are unable to radially flex outwards with respect to the axis X. At the position where the needle cover leg rib 135 no longer blocks the collar firing boss 159, the collar 117 and the plunger rod then rotate together (see FIG. 4A). This rotation occurs relative to the drive spring holder 115. This rotation stops at the position where the collar beams 141 can flex outwardly into the drive spring holder grooves 149. A rotational end stop is provided, e.g., on the drive spring holder, wherein the end stop stops rotation in that position by an angularly directed surface of the end stop abutting an angularly facing surface of the collar or the proximal surface of the drive spring holder and the distal surface of the collar abut. Alternatively or additionally, an axial end stop may be provided which stops the collar 117, e.g., the drive spring holder ring 167. The movement of the collar beams 141 radially outward is caused by the force of the drive spring 113. The collar prongs 143 which are locked into the notches have an oblique surface which is oriented in the proximal direction such that the edge of the notches 151 are pushed under the force of the drive spring 113 towards this oblique surface. The edge of the notches 151 glides in the distal direction along the collar prongs which causes the collar prongs 143 to move radially outward so that the collar beams 141 flex radially outward, and in some examples, elastically. In another embodiment the collar beams 141 during mounting are bent elastically inwardly towards the axis X and covered by the drive spring holder ring 167. The collar beams 141 then continuously apply a force towards the drive spring holder ring 167. Once the collar beams 141 face the drive spring holder grooves 149 they flex outwards into the drive spring holder grooves 149 due to the lack of radial support in this region.

The drive spring holder 115 may react a part of the drive spring force which is transferred to it via the collar beams 141 or an elastic restoring force which tends to disengage the collar beam 141 from the plunger rod 111, e.g., by radially supporting the collar beam. When the collar beam has reached the position of the groove 149 by axial and rotational movement of the collar relative to the drive spring holder, the radial support is removed and the collar beams will disengage the plunger rod. After the collar beams have disengaged the plunger rod, the beams may be biased radially inwardly. That is to say they tend to move inwardly (again). The collar beams, in particular the prongs, may abut an exterior surface of the plunger rod after the disengagement, e.g., on account of an elastic restoring force which tends to move the collar beams inwardly.

FIG. 5A is a schematic cross-sectional drawing of the collar beams 141 when having flexed radially outwards. When the collar beams 141 flex outwardly into the grooves 149 the collar 117 is not anymore connected via the collar beams 141 and the collar prongs 143 to the plunger rod 111 and the plunger rod 111 can progress in the distal direction under the force of the drive spring relative to the collar. The drive spring holder 115 comprises a radial outward step or flange, e.g., formed by the drive spring holder ring 167, wherein the radial outward step or flange has an opening wherein the collar beams 141 extend into the interior of the drive spring holder 115 through the opening and/or the radial outward step or flange defines an end stop surface for the collar 117 which stops the axial and/or rotational movement of the collar 117 when the collar beams 141 are moved towards drive spring holder 115.

FIG. 5B is a schematic cross-sectional drawing of a section of a part of the drug delivery device 100. The plunger rod 111 and the collar 117 are no longer held together by the collar beams 141. The plunger rod 111 is free to advance in the distal direction along the axis X under the force of the drive spring 113 for delivering the medicament from the syringe 109. The drive spring force, in the primed state, may be greater than or equal to any one of the following values: 20N, 25N, 30N, 45N or even higher. The plunger rod 111 may slide along the collar beams 141 during delivery. The drive spring 113 load is resolved through supporting the syringe 109 at its shoulder, either on a separate syringe holder or on a body inner tube or inner portion. The needle cover spring may bias the collar proximally relative to the drive spring holder. However, the collar beams expediently block the proximal movement as they are outwardly deflected, and in some cases, elastically, and may react the bias force, such as either by mechanical contact with a radial surface, e.g., the one of the plunger rod, and/or by mechanical contact with a distally facing surface, e.g., a surface of the drive spring holder.

FIG. 5C is a schematic cross-sectional drawing of the drug delivery device 100 in a condition close to the end of the delivery operation. Consequently, the collar beams 141 have cleared the plunger rod 111 axially and the beams 141 can flex inwardly again as depicted. As the collar beams do no longer block the proximal movement of the collar, the movement is now allowed. The needle cover spring 119 drives the collar 117 in the proximal direction along the axis X. The collar may hit an interior surface of the device, e.g., a surface of the case 201. This impact may generate a noise, e.g., upon contact with the rear case 121. In other words, the collar beams 141 of the collar 117 return to their original state when the proximal end of the plunger rod 111 has moved in front of them. The proximal end of the plunger rod 111 passes the collar beams 141 of the collar 117, allowing them to return to their original, e.g., unstressed or less stressed, state. The end of the dose noise is produced by the collar circular edge 161 of the collar 117 contacting ribs of the rear case 121 after it is pushed in the proximal direction by the needle cover spring 119. Therefore, in the present device, the needle cover spring serves two purposes, i.e., to bias the needle cover (see also the further discussions below) and to drive a feedback mechanism.

Figure 6A:
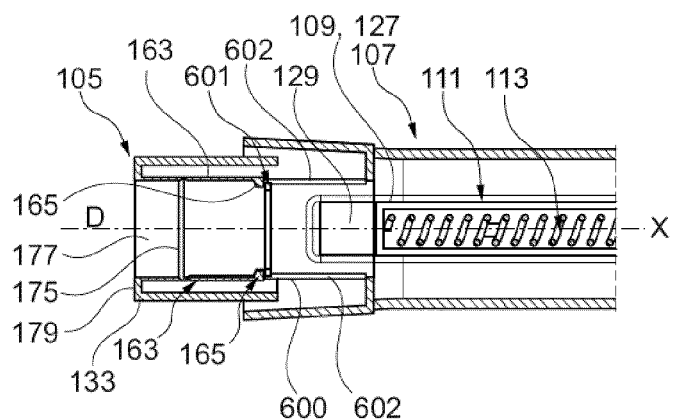
FIG. 6A is a schematic drawing of a section of the drug delivery device with the needle cover at the distal end along the first axis.

FIG. 6A is a schematic drawing of a section of the drug delivery device 100 at or near the distal end D along the axis X. It shows a part of the plunger rod 111 and of the drive spring 113 in the region of the front case 107. For purposes of better illustration, the needle is not shown. The needle may be provided at the distal end of the syringe 109, e.g., as a staked needle. After the plunger rod 111 has reached its end positon relative to the syringe 109, e.g., when the stopper 129 contacts an inner distal end wall of the syringe barrel 127, the delivery or injection operation is completed. Then the user may withdraw the device from the injection site. In order to cover the needle, the needle cover 105 may be moved distally relative to the housing or case under the action of the needle cover spring 119, expediently until the needle cover reaches an end position relative to the case or housing which may comprise the front case 107 and the rear case 121. However, other housing structures—not necessarily involving a front case and a rear case—are also possible such as a unitary housing or case. In the end position, the needle cover is expediently prevented from being moved proximally relative to the housing. In this way, the needle remains covered by the needle cover and the risk of needle stick injuries is reduced. The end position may be distally offset from a position the needle cover has before it is moved proximally relative to the case in the proximal direction in order to trigger or initiate the delivery operation. This will be discussed further below. FIG. 6A shows the end position of the needle cover after a delivery operation has been performed and the needle cover 105 has been removed from the user's skin.

In order to lock the needle cover 105 against proximal movement relative to the housing or the case, particularly in the end position after the delivery operation has been performed, the needle cover has one or a plurality of needle cover lock arms 163. In the depicted embodiment, two arms are provided. However, more than two arms may be provided as well. In case there are a plurality of arms 163 they may be evenly distributed in the angular direction. The needle cover lock arms are expediently oriented axially, particularly proximally. A free end of the needle cover lock arms 163 may face in the proximal direction. The needle cover lock arms 163 may be arranged to abut or abut a distally facing surface of the case or housing or a component which is at least axially, and in some examples both axially and rotationally, secured relative to the housing or case. In the position depicted in FIG. 6A, the proximally directed surface of the needle cover lock arm 163 is formed by the surface of a needle cover ramp or lock feature 165. The ramp or feature 165 may protrude inwardly and/or radially relative to an adjacent portion of the needle cover lock arm 163. The needle cover lock feature 165 abuts or is arranged to abut a distally facing surface of an inner portion 600 of the device. The inner portion may define an interior region. It may have a tube-like or sleeve-like shape. The inner portion 600 may be dimensioned to receive a section of the syringe 109 within its interior. Other than depicted, the inner portion 600 may provide a bearing surface, such as a proximally facing surface, for mechanical contact with the syringe, e.g., a neck portion thereof. Accordingly, the syringe may be retained in the case by the inner portion 600. The inner portion may be a holder portion or a retaining portion for the syringe 109. The inner portion 600 may be dimensioned such that the syringe 109 bears with a distally facing surface against a proximally facing surface of the portion 600, which may be a glass surface and/or a surface of a neck portion of the syringe barrel, which has a reduced diameter as compared to the portion of the syringe barrel where the stopper is guided (not explicitly shown). The inner portion has an opening, e.g., a distal opening, through which, for example, a section of the syringe and/or the needle of the syringe, which may be staked to the syringe barrel, may extend. In the section of the arms 163 which is arranged distally from the needle cover lock features 165, the arms may define an inner diameter which is greater than the outer diameter of the inner portion 600. The diameter defined between the ends of the features 165 may be smaller than the outer diameter of the inner portion but may be greater than the inner diameter of the inner portion. This ensures that the distal surface of the wall 601 of the inner portion 600 may be contacted by the needle cover lock features 165 to block proximal movement of the needle cover 105 and that the arms 163 may, in an initial position, extend along the inner portion, when the features 165 are proximally offset from a distal end of the inner portion 600 as will become apparent from the further explanations below.

The inner portion 600 may be radially spaced apart from an inner wall of a portion of the case which delimits the interior of the device from the exterior. Accordingly, a channel, e.g., an axially extending channel, which may be continuous in the circumferential direction, may be formed between the portion 600 and an inner wall of the case or housing. The channel may be configured to receive a section of the needle cover, e.g., when the needle cover is arranged in the initial position and/or moved proximally to trigger the delivery operation.

Laterally, in an outer surface of the inner portion 600, one or a plurality of guide slots 602 may be formed. The guide slots may be arranged and configured to guide the lock arms 163 axially, e.g., by receiving the needle cover lock features 165. The lock features 165 may be received in the guide slots 602 when the needle cover is in its initial position, e.g., that position from which the delivery operation may be triggered by moving the needle cover proximally. As is depicted in FIG. 6A, a distal surface of the needle cover ramp or lock feature 165 is inclined relative to the longitudinal axis X. Especially, it may be inclined in the distal direction such that, as seen in the distal direction, it includes an acute angle with the longitudinal axis X. As opposed to this, the proximally facing surface of the needle cover lock feature 165 may be, e.g., predominantly or entirely, radially oriented. For example, the proximal surface may run perpendicular relative to the longitudinal axis. Thus, the proximal surface of the lock features 165 is suitable to block proximal movement by cooperating with the distal surface of the inner portion. The distal surface of the lock features is suitable, e.g., in cooperation with a proximal end wall of the guide slot 602 in the inner portion 600, to deflect the locking arms 163 radially outwardly, when the needle cover moves distally in order to allow axial movement of the locking feature 165 beyond the initial position in a distal direction relative to the inner portion 600 In this way, the needle cover may assume its locking position, where proximal movement is no longer allowed or at least prevented such that a tip of the needle is not exposed and cannot be touched by the user.

The respective needle cover lock arm 163, which expediently has a proximally facing free end, may be flexibly, e.g., elastically, connected to the remainder of the needle cover. The arm 163 may be resiliently displaceable relative to the longitudinal axis, e.g., outwardly. The resilient bias generated by the elastic displacement of the arm may move the arm 163 and the needle cover lock feature 165 inwardly again after the feature has cleared the inner portion. The needle cover lock arm may be pivotable relative to the needle cover. The ability to pivot may be provided by way of a hinge portion 175 in the needle cover which has a reduced thickness which is located in a region of the arm 163 remote from the free end. The hinge portion may be a film hinge portion. However, already the presence of distinct arms may provide for enough resiliency or flexibility for the present purposes and the hinge portion 175, though advantageous, may be dispensed with.

The needle cover lock arm 163 may be axially oriented, e.g., parallel to the axis X. The needle cover lock arm is axially oriented in both positions, the initial position and the end position. The same may hold for an intermediate position, i.e., a position, where the needle cover is proximally displaced relative to the initial position for triggering the delivery operation.

The respective needle cover lock arm 163 is connected to the remainder of the needle cover 105 via a connecting portion 177. The connecting portion 177 may extend circumferentially and, particularly, may have the shape of a sleeve. The connecting portion 177 may be radially inwardly offset from an inner wall of the front section 133 of the needle cover 105. In this way, there may be a radial clearance between the connecting portion 177 and inner surface.

Alternatively or additionally, a distance may be present in the radial direction between the lock arm 163 and an inner surface of the front section 133 of the needle cover. This distance allows radial flexibility for radial deflection of the arm 163 in the outward direction during the movement of the needle cover into the end position and/or radially inward movement, e.g., due to its intrinsic resiliency, back into a radial position where the arm is arranged to abut the distally facing surface of the inner portion such as a surface of wall 601. The connecting portion 177 may be axially oriented. The connecting portion 177 may be connected to the front section 133 of the needle cover which defines the outer lateral surface of the needle cover via a further connecting portion 179, which may extend in the radial direction, e.g., outwardly. Connecting portion 179 may be provided at the end of the axial connecting portion 177 remote from the needle cover lock arms 163. The needle cover lock arm 163 may be restricted to the interior of the needle cover, especially its front section 133. The connecting portion 179 may provide a bearing surface for the needle cover with which the needle cover is configured to bear against the skin of a user of the drug delivery device during the delivery operation.

As compared to needle covers which use obliquely oriented fingers on an outer surface of the needle cover which interact with an inner surface of the housing for locking the needle cover in the end position after the delivery operation, the present construction with the needle cover lock arms 163 which are arranged on the interior and not on the exterior facilitates the provision of a syringe with a shorter needle. This is, because the axial extension of the slanted needle cover lock arms does not have to be taken into account when designing the needle cover. Moreover, as the needle cover lock arms are provided in the interior, they are hidden and cannot be manipulated in an attempt to reuse the device or uncover the needle again. Providing syringes with shorter needles may facilitate modifying an existing device architecture to accommodate syringes of higher volumes such as a volume greater than or equal to 2 mL, or greater than or equal to 2.5 mL or greater than or equal to 3 mL without having to extend the length of the device and/or its diameter considerably.

Aside from the shorter needle cover, the collar may assist in avoiding a considerable increase in the dimension, especially lengthwise, due to use of a higher volume syringe. Drive features, e.g., bosses, which may be required on the plunger rod, e.g., its proximal end, can be dispensed with as the collar 117 governs the rotational and axial movement of the plunger rod until the plunger rod is released from the collar. Thus, there is no need to provide the plunger rod with profiled surface structures which guide the plunger rod rotationally. The axial space which is saved by using the collar for the plunger rod release can be accommodated by a portion of the syringe.

As discussed above, the internally arranged needle cover lock arms 163 prevent proximal movement of the needle cover 105. Distal movement of the needle cover is prevented by a proximal surface which is axially secured to the housing abutting a distal surface of the needle cover such as a distal surface delimiting the needle cover cut out 137 as depicted in FIG. 6B which is discussed below.

Figure 6B:
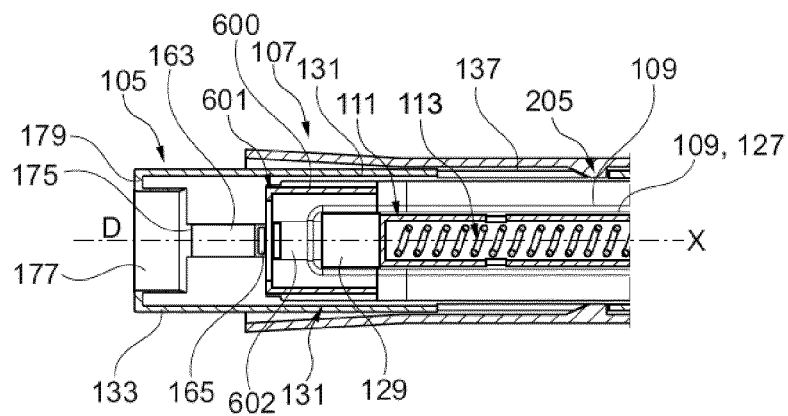
FIG. 6B is a schematic drawing of a section of the drug delivery device in FIG. 6A rotated by 90 degrees.

FIG. 6B is a schematic drawing of a section of the drug delivery device 100 at the distal end D along the axis X. The view is rotated by 90 degrees around the axis X as compared to the view of FIG. 6A. As is apparent from FIG. 6B, the needle cover cutouts 137 of the needle cover legs 131 of the needle cover 105 are guided by the serrate sections 205 of the front case 107 or another end stop secured to the case. When the proximal end of the cutouts abuts the sections 205, the needle cover is blocked from being displaced further in the distal direction due to the force applied by the needle cover spring 119. Thus, at least a portion of the needle cover spring force or the entire remaining force may be reacted by the case or housing.

The different positions of the needle cover with respect to the housing or case are explained in more detail below.

FIG. 7A is a schematic drawing of a section of the drug delivery device 100 at the distal end D showing the cap 101. The device is in a condition prior to priming, i.e., in the unprimed state. In this state, the needle cover lock arms 163 and the lock features 165 may be distally offset from the guide slots 602.

The arrangement in FIG. 7A prevents unintentional proximal movement of the needle cover and, consequently, unintentional priming of the device. In order to enable priming, the needle cover lock arms 163 have to be moved radially outwardly such that they clear the inner portion. When they have cleared the inner portion, the arms 163 may be moved axially relative to the inner portion 600 such that the needle cover 105 may perform a priming movement as has been explained further above already. When the needle cover 105 is displaced proximally relative to the case and the inner portion, the arms or the needle cover lock features 165 may be moved to engage the corresponding guide slots 602, which have been discussed previously already.

From the unprimed position in FIG. 7A, it is advantageous, if at least the radial and/or outward movement of the needle cover lock arms 163 can be effected by way of the cap 101. In other words, a mechanical interaction between the cap 101 and the needle cover lock arms 163 or the features 165 may be used to displace the needle cover lock arms 163 radially, especially outwardly. The interaction can be effected while the cap is attached to the case are at least moved towards the case so as to cover its distal end and, in some examples, the needle and/or the rigid needle shield. When the cap 101 is attached or moved towards the front case 107, a proximally facing surface of an inner tube section 181 of the cap or another component connected to the cap may engage the distally facing surface (distal surface) of the needle cover lock feature 165. This feature is oblique relative to the axis, which is why the axial movement of the cap may be used to generate irregular of movement by abutting the distal surface of the needle cover lock feature A needle shield grabber (not shown in this representation, see 103 in FIG. 1A) may be received in the inner tube 181 of the cap. The needle shield grabber may interlock with the needle shield, e.g., a rigid needle shield, of the syringe in order to remove the needle shield, when the cap is removed before the delivery operation is conducted.

The needle cover 105 may be moved axially in the proximal direction until its proximal movement is blocked, e.g., by the arms 163 or the features 165 hitting the distal surface of the inner portion. Now, further axial movement of the needle cover in the proximal direction is prevented. As the cap is moved further in the proximal direction towards its end position relative to the case, on account of the obliqueness of the distally facing surface of the needle cover lock feature 165, the feature 165 and the associated arm 163 may be deflected radially outwardly, such as towards an inner wall of the needle cover 105. Thereafter, the needle cover 105 may be moved proximally relative to the case or housing. Then, the features 165 may engage the guide slots 602. This movement of the needle cover may be effected by way of an assembly tool which can be introduced through apertures in the cap through which the needle cover 105 can be contacted. However, it is also conceivable that the axial movement of the needle cover into its initial position in which the needle cover lock features 165 engage the guide slots 602 occurs on account of the movement of the cap 101 relative to the case into its end position. In this case, the radial movement of the needle cover lock features may be effected by the portion of the cap being introduced into the interior of the needle cover. In this case, an axial support is not required to radially displace the needle cover lock arms. Whether or not the support is advisable or used for the radial displacement of the arms 163 may depend on the force required to displace the arms radially.

FIG. 7A shows the situation during the proximal movement of the cap 101 before the arms 163 are deflected radially outwardly. When the cap 101 and front case 107 are pressed together, i.e., the movement for attaching the cap is performed, the distal end of the inner portion 600 which comprises a front wall 601 presses against the needle cover ramps or lock features 165 on the needle cover lock arms 163 of the needle cover 105. The force exerted on the cap 101 flexes the needle cover lock arms 163 outwardly.

FIG. 7B is a schematic drawing of a section of the drug delivery device 100 at the distal end D showing the device in the primed position or state. Here, it can be seen that the needle cover lock arms 163 have cleared the front wall 601 of the inner portion 600 and engage the guide slots 602. As depicted in FIG. 7B, the device may be in a condition it has when the user receives the device, as the priming operation is expediently carried out by the manufacturer.

FIG. 7C is a schematic drawing of a section of the drug delivery device 100 at the distal end D showing the front case 107 and the needle cover 105 in a condition, when the needle cover 105 has been moved proximally so as to trigger the delivery operation. The needle cover 105 may be pushed in the direction towards the proximal end P by the user. As can be seen, the needle cover lock arms 163 and, in particular, the needle cover lock features 165 overlap axially with and/or are radially offset from the syringe 109. FIG. 7C shows the situation when, starting from FIG. 7B, the cap 101 has been removed—optionally together with the needle shield 125—in order to prepare the device for the delivery operation. Thereafter, the needle cover may be moved into the proximal direction to trigger the delivery operation. While the needle cover is moved from the position depicted in FIG. 7B into to the position depicted in FIG. 7C, the arms 163 and the needle cover lock features 165 are not radially deflected. Rather the arms stay axially oriented parallel to the axis X which runs through the proximal and distal ends. From FIG. 7C it is apparent that the needle cover 105 has been moved proximally and the needle cover lock features 165 have been displaced proximally within the associated guide slot 602 into an end position. The end position of the needle cover 105 relative to the case may be defined by an abutment between a proximally facing surface of the needle cover and a distally facing surface of the housing, e.g., by an abutment between the front section 133 of the needle cover 105 and a distally facing end surface proximally delimiting the channel in the case which receives the front section 133 during the proximal movement of the needle cover 105.

As is depicted in FIG. 7C, the needle shield 125 has been removed. The needle is not explicitly shown for illustration purposes. However, it is, nevertheless, present. Also, the inner portion 600, as discussed previously already, may support the syringe 109 such that the syringe 109 cannot be moved distally relative to the housing or case.

After the injection operation or delivery operation has been performed, the needle cover 105 may be moved towards the end position and into the imposition by way of the needle cover spring as has already been discussed previously.

FIG. 7D is a schematic drawing of a section of the drug delivery device 100 at the distal end D showing the front case 107 and the needle cover 105 in an end position after dose delivery has been completed and the user has removed the device from the skin. As compared to the position in FIG. 7C, the needle cover 105 has advanced forward, i.e., distally, due to the action of the needle cover spring 119. The needle cover lock arms 163 ensure needle safety by pressing against the front wall 601 by way of the features 165. Distal movement of the needle cover is prevented by the features 205 abutting a distally facing surface of the needle cover such as the end surface of the needle cover cutout 137.

Figure 8A:
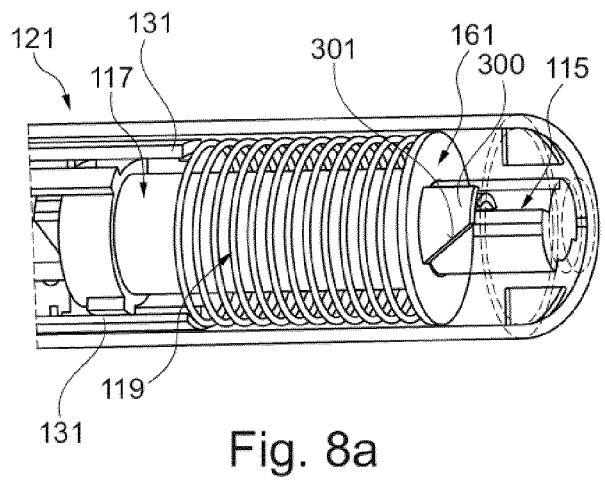
FIG. 8A and FIG. 8B illustrate an embodiment of a needle cover lock mechanism suitable for the drug delivery device.
Figure 8B:
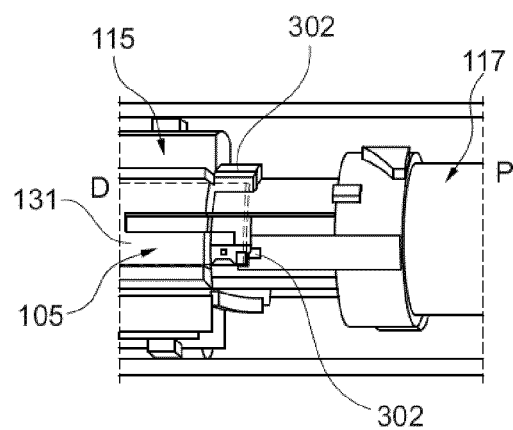

FIGS. 8A and 8B illustrate an alternative to the needle cover lockout mechanism which has been described above, using the needle cover lock arms 163. The needle cover lock mechanism could also be provided in addition to the mechanism discussed in conjunction with FIGS. 6A through 7D.

As has been discussed previously the collar or plunger rod release member 117 is moved proximally after the plunger rod has been released from the collar. Then the drive spring force is no longer transferred to the collar 117. When moving proximally, the collar 117 moves towards an inner surface of the case or housing. The proximal movement of the collar 117 is driven by the needle cover spring 119, which is operatively coupled between the needle cover 105 and the collar, e.g., by abutting the distal surface of flange 161. In the previously described embodiment, the collar may move purely axially in the proximal direction. It is, however, possible to use force of the needle cover spring to rotate the collar 117, e.g., to establish a needle cover lock by means of the collar in order to lock the needle cover 105 against proximal movement in the end position. The end position may be distally offset from the initial position.

FIG. 8A shows the collar 117. As opposed to the previous representation, the collar has a feature 300 which has an oblique or ramp surface 301 which extends in the angular direction. The surface 301 can be arranged to interact with a feature which is axially secured relative to the case, such as a feature (not explicitly shown) within the case or a feature (not explicitly shown) on the drive spring holder 115 during the proximal movement of the collar 117. In this way, due to the interface which is formed between the ramp surface 301 and the case or drive spring holder, the collar may be rotated relative to the case and/or the drive spring holder 115. The rotation may be in the same direction as the one, which was performed during priming and/or release of the plunger rod. Alternatively, the rotation may be in the opposite direction.

Due to the rotation, a feature on the collar such as a needle cover lock feature 302 provided on the collar may be rotated into a position where it angularly and radially overlaps with a proximally facing surface associated with the needle cover, e.g., a proximal surface of the needle cover legs 131. In this position, the lock feature 302 may abut or be arranged to abut the needle cover 105. As the collar, in its proximal end position cannot be moved proximally anymore, e.g., as it abuts a distally facing surface of the case, the abutment between the needle cover and the needle cover lock feature 302 on the collar prevents proximal movement of the needle cover and, accordingly, provides a needle cover lockout suitable to lock the needle cover in its end position against proximal movement relative to the case or housing.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis Y of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis Y of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An examples of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g., a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present concepts, which encompass such modifications and any and all equivalents thereof.

REFERENCE NUMERALS

D Distal end
P Proximal end
X Longitudinal axis
100 Drug delivery device
101 Cap
103 Grabber
105 Needle cover
107 Front case
109 Syringe
111 Plunger rod
113 Drive spring
115 Drive spring holder
117 Collar
119 Needle cover spring
121 Rear case
123 Collar tube
125 Protective needle shield
127 Syringe barrel
129 Stopper
131 Needle cover leg
133 Front section
135 Needle cover leg rib
136 Proximal surface of needle cover leg rib
137 Needle cover cutout
139 Drive spring holder sawtooth boss
141 Collar beam
143 Collar prong
145 Collar tongue
147 Collar priming boss
149 Drive spring holder groove
151 Notch
153 Drive spring holder arm
155 Drive spring holder disc
157 Drive spring holder rail/slots
159 Collar firing boss
161 Collar circular edge
163 Needle cover lock arm
165 Needle cover ramp/Needle cover lock feature
167 Drive spring holder ring
168 Distal end stop surface
169 Drive spring holder cavity
171 Fixing portion
173 Sawtooth boss surface
175 Hinge portion
177 Connecting portion
179 Connecting portion
181 Inner tube
201 Case
203 Window
205 Serrate section
300 Feature
301 ramp surface 302 Needle cover lock feature
600 inner portion
601 Front wall
602 Guide slot

The invention claimed is:

1. An arrangement for a drug delivery device, comprising:
a housing having a proximal end, a distal end, and a longitudinal axis extending between the proximal end and the distal end;
a blocking feature rotationally secured relative to the housing;
a drive unit arranged to provide energy for a delivery operation of the arrangement;
a plunger rod operatively coupled to the drive unit and arranged to move distally relative to the housing in the delivery operation by the energy provided by the drive unit; and
a movable trigger member;
wherein the arrangement is configured such that, in the delivery operation, the plunger rod is rotatable relative to the housing into a release position;
wherein the arrangement has an unprimed state and a primed state, in the unprimed state, the blocking feature is arranged to block a rotation of the plunger rod into the release position, and in the primed state, a trigger member feature of the trigger member is arranged to block rotation of the plunger rod into the release position;
wherein the trigger member is arranged to move relative to the housing to release the plunger rod for the delivery operation; and
wherein, to switch from the unprimed state to the primed state, the trigger member is movable relative to the housing, and the arrangement is configured such that a movement of the trigger member is converted into an axial movement of the plunger rod relative to the blocking feature, such that the blocking feature no longer blocks rotation towards the release position.

2. The arrangement of claim 1, wherein, in the unprimed state, the trigger member is operatively connectable to the plunger rod; and
wherein an axial movement comprises a proximal movement of the plunger rod relative to the housing when the movement of the trigger member is in a proximal direction relative to the housing.

3. The arrangement of claim 1, wherein, when switching from the unprimed state to the primed state, the plunger rod is configured to rotate towards the release position, the rotation being stopped by the trigger member feature; and/or,
wherein, when in the primed state, the plunger rod is rotationally biased towards the release position by a force of the drive unit.

4. The arrangement of claim 1, wherein the trigger member is a needle cover that is moveable relative to the housing and arranged to cover a needle during delivery operation of the arrangement.

5. The arrangement of claim 1, wherein the trigger member is movable in a priming direction from a first position to a second position relative to the housing for switching the arrangement from the unprimed state to the primed state;
wherein the priming direction is the same direction in which the trigger member is moved for releasing the plunger rod in the delivery operation; and
wherein the priming direction is an axial direction.

6. The arrangement of claim 5, comprising a trigger member spring arranged to bias the trigger member towards the first position when the trigger member is in the second position.

7. The arrangement of claim 1, wherein, in the primed state and/or in the unprimed state, the plunger rod is rotationally and axially secured to a plunger rod release member by a plunger rod release feature that engages a retention feature of the plunger rod, such that, when switching from the unprimed state to the primed state, the plunger rod release member moves together with the plunger rod; and
wherein the plunger rod release member is arranged to interact with a blocking surface of the blocking feature in the unprimed state to block rotation of the plunger rod.

8. The arrangement of claim 7, wherein, in the primed state, a drive feature of the plunger rod release member, abuts a helical, drive surface of the blocking feature; and
wherein the abutment is maintained by the drive unit.

9. The arrangement of claim 7, wherein, in the delivery operation, the plunger rod release member and the plunger rod rotate together from an initial position to the release position; and
wherein, in the release position, the plunger rod is released from the plunger rod release member by disengaging the plunger rod release feature from the retention feature and moves distally relative to the plunger rod release member.

10. The arrangement of claim 7, wherein a trigger member priming surface is arranged to cooperate with an oblique surface of a release member priming feature of the plunger rod release member when the arrangement is being switched from the unprimed state to the primed state; and
wherein the trigger member priming surface is integrated into the trigger member feature.

11. The arrangement of claim 1, wherein the trigger member feature has an L-shape;
wherein the trigger member is axially guided; and/or
wherein the blocking feature is axially and rotationally secured relative to the housing.

12. The arrangement of claim 1, wherein, when the arrangement is in the unprimed state, a proximal surface of the trigger member feature is arranged to transfer force to the plunger rod to move the plunger rod; and/or
wherein, when the arrangement is in the primed state, an angular surface of the trigger member feature is arranged to block rotation of the plunger rod into the release position.

13. The arrangement of claim 1, wherein, when the arrangement is in the primed state, a distal surface of the trigger member feature is arranged to block distal movement of the trigger member relative to the housing; and/or
wherein, when the arrangement is in the primed state, the trigger member is biased in the distal direction.

14. The arrangement of claim 7, comprising a distal end stop surface axially and rotationally secured relative to the housing and arranged to stop axial movement of the plunger rod release member relative to the housing.

15. The arrangement of claim 1, wherein the trigger member feature is a needle cover leg rib.

16. The arrangement of claim 1, wherein the trigger member comprises a sleeve-like portion that protrudes distally from the housing.

17. The arrangement of claim 1, wherein the trigger member comprises one or more arms, wherein the one or more arms extend axially towards a proximal end.

18. The arrangement of claim 7, wherein the plunger rod release member is a collar.

19. The arrangement of claim 7, wherein the trigger member feature is configured to mechanically interact with a collar firing boss arranged at an outer surface of the plunger rod release member.

20. A drug delivery device comprising the arrangement of claim 1, comprising a drug.

* * * * *